(12) United States Patent
Kearney et al.

(10) Patent No.: US 12,447,693 B2
(45) Date of Patent: *Oct. 21, 2025

(54) SUPPORT STRUCTURE FOR A PERSONAL CARE PRODUCT

(71) Applicant: The Gillette Company LLC, Boston, MA (US)

(72) Inventors: Robert Andrew Kearney, Reading (GB); Stephen Andrew Baldwin, Reading (GB)

(73) Assignee: The Gillette Company LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,442

(22) Filed: Apr. 15, 2022

(65) Prior Publication Data
US 2022/0332055 A1 Oct. 20, 2022

Related U.S. Application Data

(60) Provisional application No. 63/177,273, filed on Apr. 20, 2021.

(51) Int. Cl.
*B29C 65/48* (2006.01)
*A45D 26/00* (2006.01)
(Continued)

(52) U.S. Cl.
CPC .............. *B29C 65/48* (2013.01); *A45D 26/00* (2013.01); *A61B 17/54* (2013.01);
(Continued)

(58) Field of Classification Search
CPC ......... B29C 65/48; A45D 26/00; A61B 17/54; A61B 2017/00526; B26B 21/4012; B26B 21/56; B26B 21/20; B29L 2031/7186
See application file for complete search history.

(56) References Cited

U.S. PATENT DOCUMENTS 918,126 A 4/1909 Clark
1,744,280 A 1/1930 Peterson
(Continued)

FOREIGN PATENT DOCUMENTS

CN 111000625 A 4/2020
CN 210915683 U 7/2020
(Continued)

OTHER PUBLICATIONS

LD Davis Glues & Gelatins, "Best Practices for Liquid Water-Based Adhesives" Posted online Jan. 29, 2019. Accessed at <https://blog.lddavis.com/best-practices-for-liquid-water-based-adhesives> (Year: 2019).*

(Continued)

*Primary Examiner* — Alex B Efta
*Assistant Examiner* — Alexander S Wright
(74) *Attorney, Agent, or Firm* — Andrés E. Velarde

(57) ABSTRACT

This invention relates to a novel of making a personal care product including the steps of providing a treatment sheet comprised of a first material and a first plurality of apertures and joining a support structure to the lower surface of the treatment sheet. The support structure includes a support material, a support sheet, a support ring, or any combination thereof. The support sheet includes a second plurality of apertures. The support sheet is disposed beneath the treatment sheet by aligning the first plurality of apertures and the second plurality of apertures. Fluid support material is solidified such that the treatment sheet and the support sheet are bonded together. The support ring is disposed on a housing (e.g., in a groove) below the support sheet or joined to the treatment sheet via the support material prior to solidifying.

11 Claims, 18 Drawing Sheets

(51) Int. Cl.
    *A61B 17/00*     (2006.01)
    *A61B 17/54*     (2006.01)
    *B26B 21/40*     (2006.01)
    *B29L 31/00*     (2006.01)

(52) U.S. Cl.
    CPC .............. *B26B 21/4012* (2013.01); *A61B 2017/00526* (2013.01); *B29L 2031/7186* (2013.01)

(56) References Cited

U.S. PATENT DOCUMENTS

| | | | |
|---|---|---|---|
| 2,119,021 | A | 5/1938 | Moskovies |
| 2,223,286 | A | 11/1940 | Johnson |
| 2,614,321 | A * | 10/1952 | Ackerman .............. B26B 21/20 30/34.2 |
| 3,465,436 | A | 9/1969 | Musso |
| 3,473,220 | A | 10/1969 | Paul |
| 4,324,041 | A | 4/1982 | Trotta |
| 4,964,214 | A | 10/1990 | Welsh et al. |
| 4,984,365 | A * | 1/1991 | Leonard .................. B26B 21/00 30/34.05 |
| 5,018,274 | A * | 5/1991 | Trotta .................... B26B 21/20 76/DIG. 8 |
| 5,490,329 | A | 2/1996 | Chylinski |
| 5,604,983 | A | 2/1997 | Simms et al. |
| 6,161,287 | A | 12/2000 | Swanson et al. |
| 9,539,734 | B1 | 1/2017 | Bozikis et al. |
| D791,960 | S | 7/2017 | Guanying |
| 2001/0003870 | A1 | 6/2001 | Eichhorn |
| 2012/0304467 | A1 | 12/2012 | Garden, Jr. |
| 2013/0031794 | A1 | 2/2013 | Duff, Jr. et al. |
| 2014/0100589 | A1 | 4/2014 | Gordon et al. |
| 2015/0133984 | A1 * | 5/2015 | Loreth ............ A61B 17/32002 29/428 |
| 2020/0205859 | A1 | 7/2020 | Comstock |
| 2021/0031387 | A1 | 2/2021 | Paspatis |
| 2022/0168912 | A1 | 6/2022 | Abramsky |
| 2022/0330674 | A1 | 10/2022 | Kearney et al. |
| 2022/0330675 | A1 | 10/2022 | Kearney et al. |
| 2022/0330983 | A1 | 10/2022 | Kearney et al. |
| 2022/0330984 | A1 | 10/2022 | Kearney et al. |
| 2022/0330985 | A1 | 10/2022 | Kearney et al. |
| 2022/0332001 | A1 | 10/2022 | Kearney et al. |

FOREIGN PATENT DOCUMENTS

| | | |
|---|---|---|
| EP | 0276066 A1 | 7/1988 |
| EP | 0305883 A2 | 3/1989 |
| EP | 1306173 A1 | 5/2003 |
| GB | 2114491 A | 8/1983 |
| WO | 9955499 A2 | 11/1999 |
| WO | 2020128706 A1 | 6/2020 |

OTHER PUBLICATIONS

Isaac Morey, "What does it mean when we say 100% RTV Silicone?", Silicone Depot. Published Mar. 16, 2018. Accessed at <https://siliconedepot.com/blog/what-does-it-mean-when-we-say-100-rtv-silicone> (Year: 2018).*

PCT Search Report and Written Opinion for PCT/US2022/025277 dated Sep. 1, 2022, 12 pages.

All Office Actions; U.S. Appl. No. 17/721,435, filed Apr. 15, 2022.
All Office Actions; U.S. Appl. No. 17/721,436, filed Apr. 15, 2022.
All Office Actions; U.S. Appl. No. 17/721,438, filed Apr. 15, 2022.
All Office Actions; U.S. Appl. No. 17/721,439, filed Apr. 15, 2022.
All Office Actions; U.S. Appl. No. 17/721,441, filed Apr. 15, 2022.
All Office Actions; U.S. Appl. No. 17/721,440, filed Apr. 15, 2022.

* cited by examiner

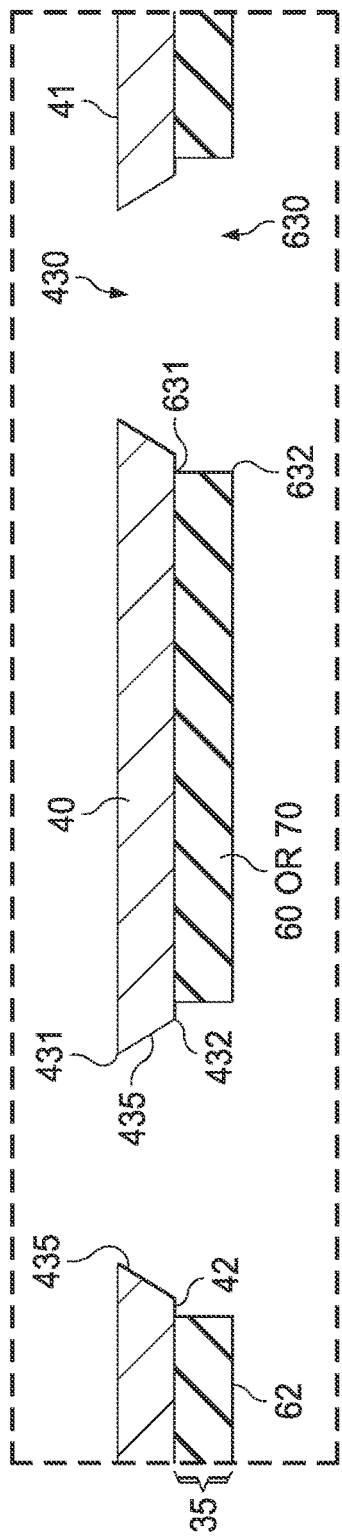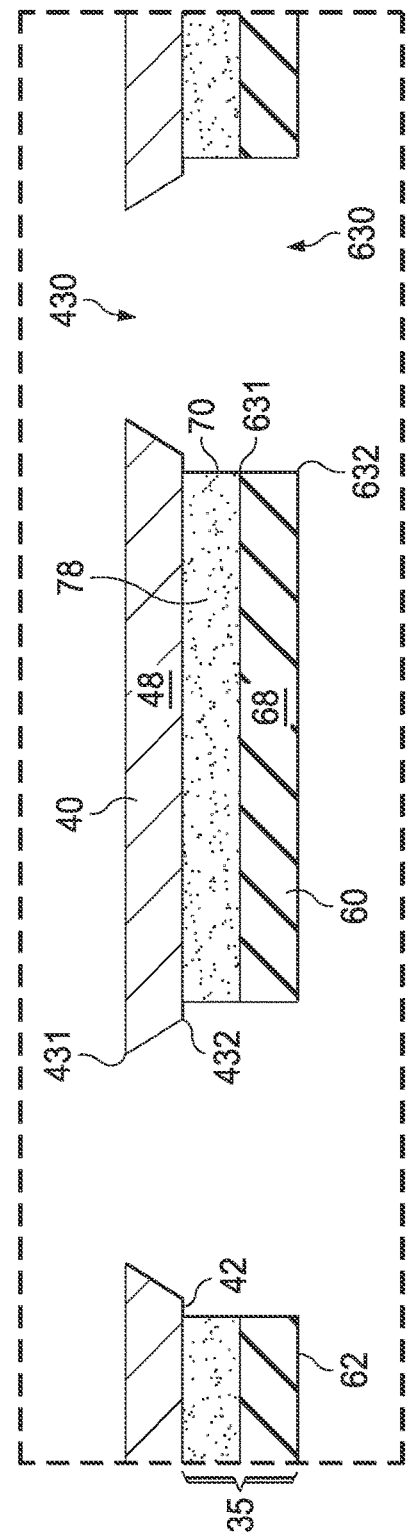

SUPPORT STRUCTURE FOR A PERSONAL CARE PRODUCT

CROSS-REFERENCE TO RELATED APPLICATIONS

The present application is related to application Ser. Nos. 63/177,264 and 63/177,269 filed on the same date and by the same Assignee as the present application, which are not admitted to being prior art with respect to the present invention by its mention in the cross-reference section. These applications are incorporated herein by reference in their entirety.

FIELD OF THE INVENTION

This invention relates to personal care products, and more particularly those products comprising both skin treatment and/or hair removal.

BACKGROUND OF THE INVENTION

In the prior art there are personal care products for either skin treatment or hair removal. Some known prior art discloses shavers for removing hair having blades with apertures, whereby the apertures have sharp cutting edges. In other prior art, wet shavers have razor blades that cut hairs or electric shavers have cutter systems comprising of shearing blades that move beneath a foil with apertures to cut hairs. Many of the prior art shavers are specifically designed to remove hair and thus generally are not optimized for effective skin treatment purposes.

Those personal care products optimized for, e.g. skin exfoliation or dermaplaning that comprise cutting edges are generally constructed from a metal foil with cutting edges that protrude beyond the surface of the foil.

Often, these products comprise many components that if dropped or succumbed to substantial forces or impact, the components, including the cutting edges, may become dinged, deformed, broken, loosen or disassemble one from the other.

While the above products will break and deform when dropped, this becomes a greater issue when blades are fabricated from a more brittle material than metal, e.g. ceramic or semiconductor. Such materials have not been used for commercially available shavers or other personal care products, because optimal solutions have not yet been found that provide stability and support for such blades.

It is desirable to provide a personal care product that is optimized for both skin treatment and hair removal which also has structures or materials for support and stability.

SUMMARY OF THE INVENTION

The present invention is directed to a method of making a personal care product including the steps of providing a treatment sheet comprised of a first material and a first plurality of apertures, the treatment sheet having an upper and a lower surface, and joining a support structure to the lower surface of the treatment sheet.

In an embodiment of the present invention, the support structure includes a support material, a support sheet, a support ring, or any combination thereof.

In one aspect, the support sheet includes a second plurality of apertures.

In another aspect, the support material is a fluid, and wherein the step of joining further includes applying the fluid to a lower surface of the treatment sheet, to an upper surface of the support sheet, or both.

In one embodiment, the step of joining further includes the step of disposing the support sheet beneath the treatment sheet.

In another embodiment, the step of joining further includes the step of aligning the first plurality of apertures and the second plurality of apertures.

In yet another embodiment, the step of joining further includes the solidifying the fluid of the support material such that the treatment sheet and the support sheet are joined together forming an upper treatment unit portion.

Further steps of the method of the present invention include providing a housing and disposing the support ring on or in a surface of the housing, the support ring disposed below the support sheet or joined to the treatment sheet via the support material prior to the solidifying step. Still further steps include providing a housing having a groove and disposing the support ring within the groove.

In an embodiment of the present invention, the method further includes placing the upper treatment unit portion onto an upper surface of the support ring.

In other aspects, the fluid of the support material includes a polymeric material and the polymeric material includes an adhesive, a varnish, or inks, or any combination thereof.

In still other aspects, the support sheet includes metal, ceramic, thermoplastic, thermoset, or elastomeric polymer.

In yet other aspects, the support ring includes thermoplastic, thermoset, or elastomeric polymer or any combination thereof. The support ring of the present invention can include RTV silicone rubber.

In one embodiment of the present invention, the treatment sheet is brittle.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In addition, the materials, methods, and examples are illustrative only and not intended to be limiting.

Other features and advantages of the invention will be apparent from the following detailed description, and from the claims.

BRIEF DESCRIPTION OF DRAWINGS

While the specification concludes with claims particularly pointing out and distinctly claiming the subject matter that is regarded as the present invention, it is believed that the invention will be more fully understood from the following description taken in conjunction with the accompanying drawings.

FIGS. 5A and 5B depict close-up cross-sectional views of treatment units of FIGS. 4A and 4C of a personal care product of the present invention.

DETAILED DESCRIPTION OF THE INVENTION

Figure 1A:
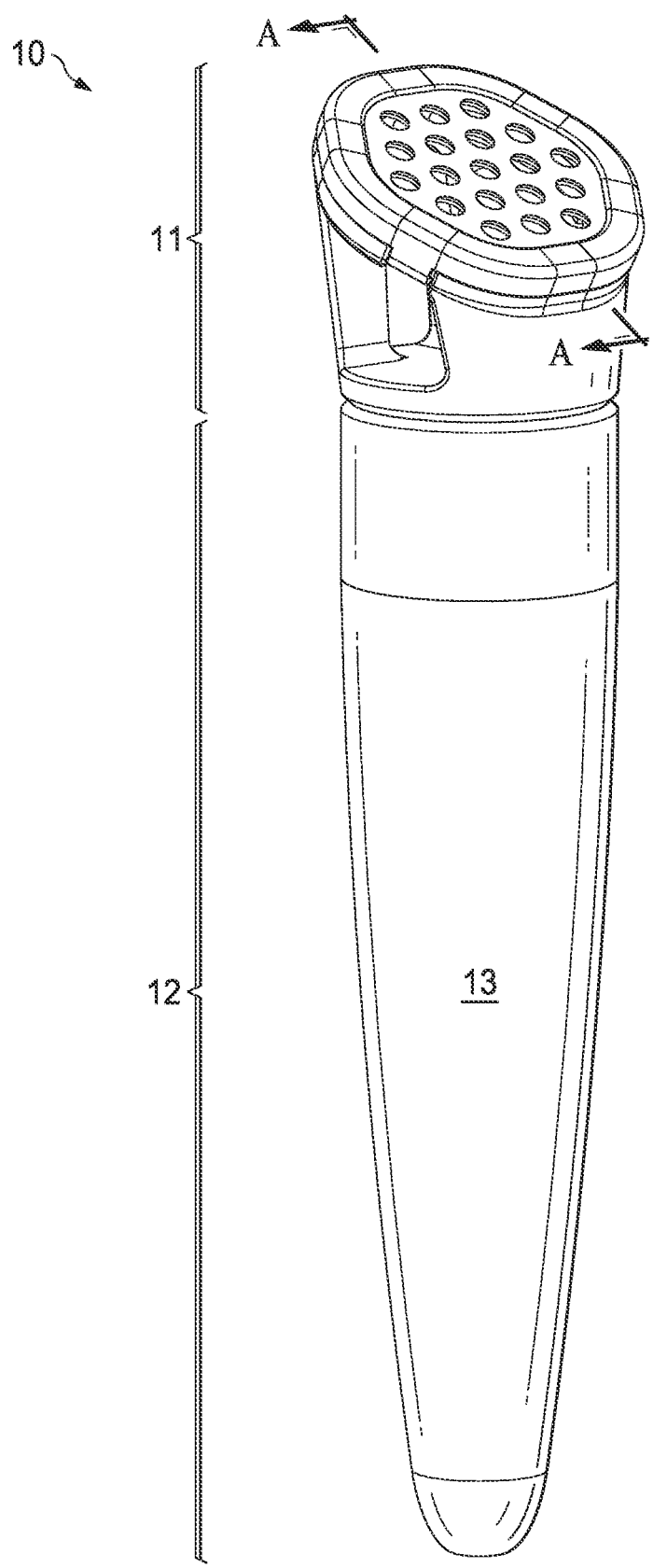
FIGS. 1A, 1B, and 1C depict a side view, an exploded side view and a top view of an embodiment of a personal care product of the present invention.

In the present invention, a personal care product comprises a treatment sheet disposed over an opening at the top of a housing located at an upper end of the product whereby the treatment sheet comprises apertures with cutting edges. The treatment sheet of the present invention is a component of a treatment unit wherein the treatment unit also comprises a support structure disposed adjacent to the treatment sheet. The support structure of the present invention can be a support material, a support sheet or a support ring, or any combination thereof.

The housing further comprises a cavity surrounded by side walls whereby the treatment unit generally being disposed above the cavity. A plurality of openings or "windows" may be formed in the side walls of the housing, which provide a multi-directional flow path for rinsing fluid (e.g., water) for removing debris after use of the personal care product. In addition, a frame member retains the treatment sheet in place on an upper surface of the housing of the personal care product. If tabs are present along the outer surface of the frame member, they can assist in securing the treatment unit to the housing by being inserted into notches on upper ledges of the housing windows.

The cutting edges of the apertures in the treatment sheet are coplanar and do not protrude or extend beyond an upper or lower surface of the treatment sheet, Durable cutting edges can be produced from materials like ceramic or crystals like silicon, sapphire, or diamond. These materials are not ductile like metal and often are brittle, and thus they cannot be formed into e.g., a domed or convex shape, but rather are planar sheets. This type of planar treatment surface increases the treatment efficiency such as the removal of hair or dermaplaning of skin on extended flat surfaces of skin such as legs, chest and back.

The term "product" as used herein includes an upper end and a lower end, wherein the upper and lower ends are either permanently or releasably coupled together. The upper end of the product of the present invention generally includes, but is not limited to, a treatment, a housing, sheet and a frame member.

The term "housing" as used herein may include, but is not limited to, a structure at the upper end of the product. The housing may be permanently affixed to the upper product end or it may be releasable from a lower end of the product. The housing in the present invention carries a treatment unit and preferably comprises a cavity bound by columns or struts and windows. The housing generally has a substantially cylindrical shape though any feasible shape is contemplated by the present invention.

The term "treatment sheet" in the personal care product of the present invention refers to a planar sheet comprising a plurality of apertures. The periphery or perimeter of the apertures comprise cutting edges, used for removing hair and exfoliation or other treatments on skin.

The treatment sheet is desirably flat. A "flat" material generally has planar surfaces without protrusions or indentations. As used herein, "flat" and "planar" can be used interchangeably.

The treatment sheet is also desirably rigid. A "rigid" material signifies that the material is not flexible and cannot be easily bent.

The function of the treatment sheet in the personal care product is to both remove hair and to treat the skin and this is achieved by the structure of the treatment sheet noted above.

The treatment sheet of the present invention is desirably comprised of a solid, non-corroding material. The treatment sheet can be comprised of amorphous materials such as glass, crystalline materials such as silicon, diamond, sapphire, polycrystalline materials such as silicon, ceramic, or metals (e.g., steel), or any combination thereof. These materials can be shaped into rigid planar treatment sheets with apertures. Despite their rigidity, these materials can be fairly brittle. A "brittle" material is a material that generally fractures under load with little elastic or plastic deformation. The treatment sheet comprised of these materials, such as silicon and diamond, could shatter or break into pieces if the personal care product is dropped, if it is contacted with force, or takes the impact of a large force. Accordingly, the present invention increases the stability of the treatment sheet by providing a support structure. The support structure can be comprised of one or more elements. Preferably, the treatment sheet substrate is comprised of a silicon material and the cutting edges are comprised of a diamond material.

A "treatment unit" of the present invention comprises a treatment sheet and at least one other support structure or material. The support structure may itself be comprised of one or more types of structures or materials and serves to support the treatment sheet providing stability, by reducing impact to the treatment sheet if an external force is applied to the treatment sheet or any component of the personal care product and by reducing damage to the treatment sheet and thus preventing injury to the consumer if the personal care product is dropped and fragments of the treatment sheet separate from the treatment unit.

The "support structure" as used herein, signifies a structure disposed either beneath the treatment sheet, (e.g., joined to the lower surface of the treatment sheet, as will be described below), around perimeter portions of the treatment sheet (e.g., in the form of a ring), or both.

The "support structure" may comprise a support material such as a substance or material that is comprised of a fluid and cures or dries or hardens to form a solid material. Such materials can be one or more of the following: adhesive, varnish or ink, many of which are comprised of polymeric materials. These materials can be applied by spraying, printing on, rolling, or dipping, or any combinations thereof. Desirably, the support material is comprised of a material different than the material of the treatment sheet. If the support material is an adhesive, it is preferable that the adhesive solidify and bond to at least a portion of a surface of the treatment sheet. The bonded area is desirably greater than half the surface of the treatment sheet (e.g., lower surface), preferably greater than 90% of the treatment sheet surface. Such an embodiment is shown and described related to FIGS. 2E and 4B as non-limiting examples.

The "support structure" may also be in the form of a solid material, whereby the solid material may be provided but not limited in form of a sheet, a mesh or wires. The solid material may comprise metal, ceramic thermoplastic, thermoset, or elastomeric polymers. If applied to a surface of the treatment sheet, it is desirable that the support structure is conformal or compliant to a portion or substantially all of that surface of the treatment sheet, i.e. the support structures should be in intimate contact with the surface to the treatment sheet and follow the contours of any indentations or protrusions that may be present on the surface of the treatment sheet. Such an embodiment is shown and described related to FIG. 4A as one non-limiting example.

If the support sheet is in this form of a "layer" or a "sheet" of material then the treatment unit desirably further comprises a support material, such as an adhesive disposed between a portion of the lower surface of the treatment sheet and the upper surface of the support sheet to join or bond the support sheet to the treatment sheet. The adhesive may be provided as a separate material that is applied to either the lower surface of the treatment sheet or the upper surface of the support sheet or both prior to joining the two together or it may be provided as a layer pre-applied to the upper surface of the support sheet so that the support sheet becomes a "self-adhesive" support sheet. Such self-adhesive materials may include self-adhesive metal tapes or polymer tapes. Such an embodiment is shown and described related to FIG. 4C as one non-limiting example.

The treatment unit may comprise a support structure comprised of a third structure and/or material, disposed desirably at a perimeter area of the treatment sheet and/or perimeter areas of any other support structures present in the treatment unit, e.g., at the upper and lower outer perimeter areas of the treatment unit. The third support structure can be in the shape of a ring desirably in the form of an elastomer tube or flat ring. Such a ring maybe joined to an upper surface of the housing or disposed into a groove on the upper surface of the housing. In the fully assembled upper product end including the housing, treatment unit and frame member Such embodiments are shown and described related to FIGS. 6A, 6B, 7A-7E, 8A, 8B, 9A and 9B as non-limiting examples.

Thus, the treatment unit of the present invention comprises a treatment sheet and at least one support structure of any type. The support structure disposed in the treatment unit of the present invention can comprise a support material, such as an adhesive or varnish, disposed under a treatment sheet, a layer or a solid support sheet, made e.g. from metal, disposed under a treatment sheet, with or without a support material (e.g., adhesive), and/or a support ring, such as an elastomeric ring, disposed at perimeter areas of a treatment sheet and/or any other support structures in the treatment unit.

Finally, the treatment unit may include any number of one or all of the above forms of the support structures in addition to the treatment sheet. Any feasible permutation of at least one support structure (e.g., support material, support sheet, or support ring) is contemplated in the present invention.

If the product is dropped with any of the treatment unit embodiments which contain at least a support ring of the present invention, the treatment sheet is prevented from cracking because the support ring 80 reduces the force acting upon the brittle treatment sheet.

If the product is dropped with any of the treatment unit embodiments which contain a support sheet and/or a support material of the present invention, and the treatment sheet cracks, fractured pieces of the treatment sheet are held together, and the consumer is protected from injury.

Figure 1B:
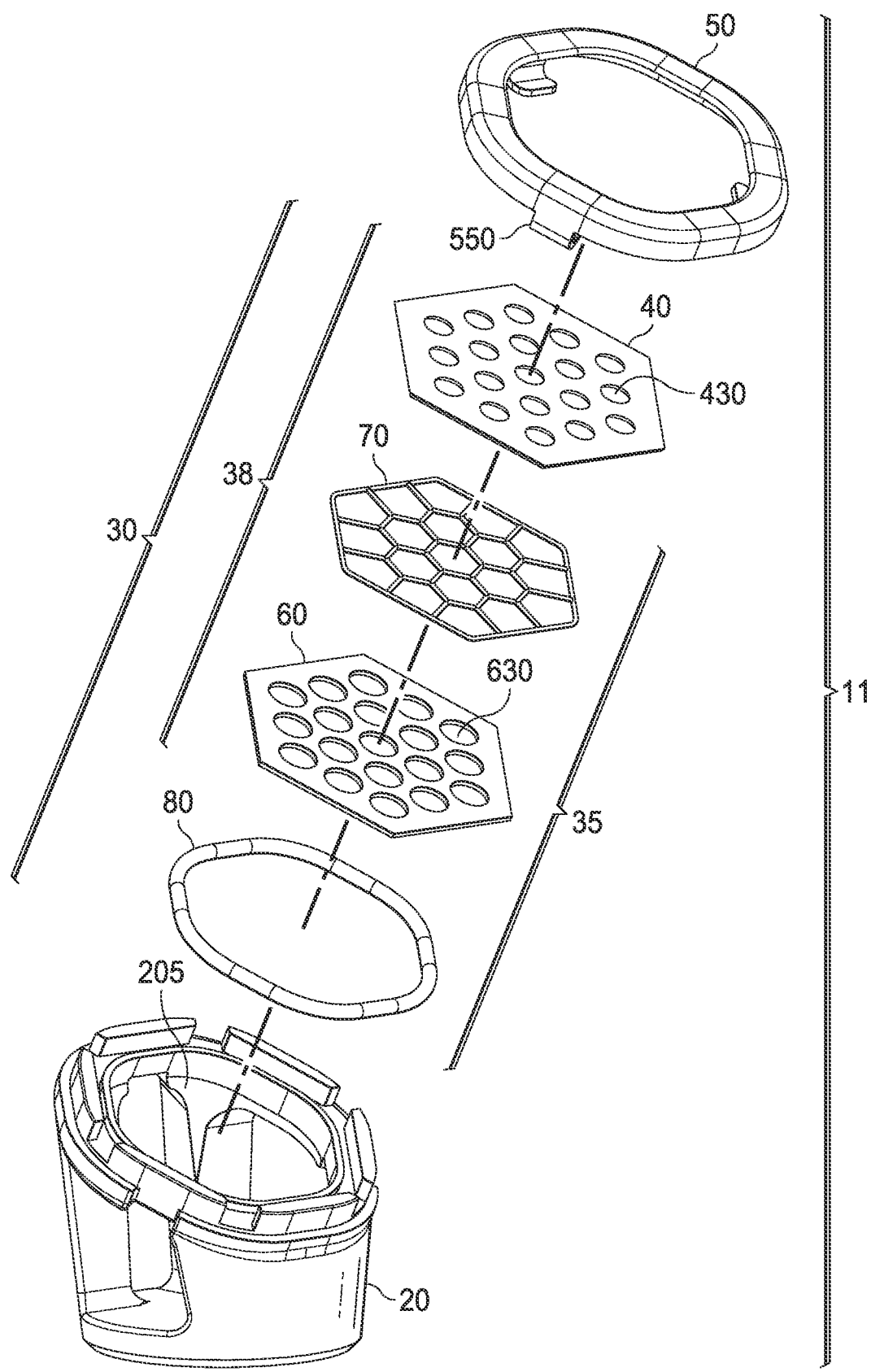

The present invention discloses embodiments of a treatment unit of a personal care product. Referring to FIGS. 1A and 1B, a side view of a personal care product 10 is shown comprising an upper product end 11 and a lower product end 12, where a handle 13 used for gripping and turning the product is generally disposed in the lower product end. The upper product end 11 comprises a treatment unit 30 disposed on or within a housing 20 over a top opening 205 of the housing 20, and a frame member 50 disposed over the treatment unit 30. As shown in the exploded view in FIG. 1B, the treatment unit 30 is comprised of a treatment sheet 40, and a support structure 35 comprised of a support sheet 60, a support material 70 and a support ring 80. While in a preferred embodiment of the personal care product 10, the support structure 35 comprises of all three of these structures shown in FIG. 1B, one or two or any combination of the support sheet 60, the support material 70 and the support ring 80 are also contemplated as part of the present invention.

Figure 1C:
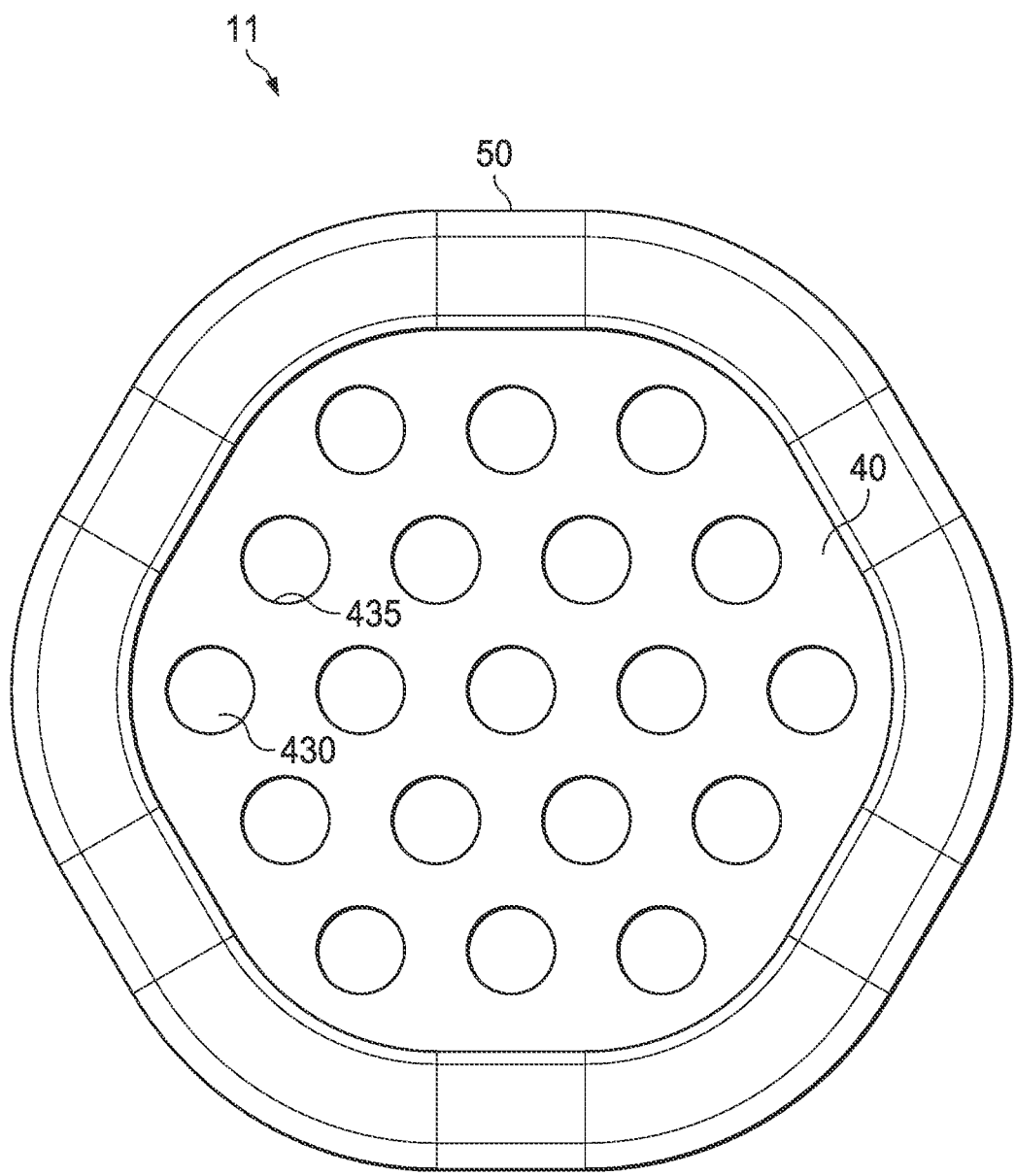

The treatment sheet 40 shown in FIGS. 1A, 1B and 1C has generally hexagonal shape, though any shape is contemplated in the present invention. The treatment sheet 40 includes apertures 430 in which cutting edges 435 are formed (see FIG. 1C). The cutting edges 435 in the treatment sheet function to remove hair and exfoliate skin of the user.

The support sheet 60 is disposed beneath the treatment sheet 40 and generally has the same shape as the treatment sheet, e.g. hexagonal in the present invention, though any shape is contemplated. The support sheet 60 comprises apertures 630 that generally line up beneath the apertures 430 of the treatment sheet, however unlike those of the treatment sheet, the apertures of the support sheet do not comprise cutting edges. This alignment provides for a flow path into the cavity of the housing for debris removal. Generally, the apertures of the support sheet 60 are larger than the apertures of the treatment sheet 40. When viewing the treatment sheet directly from the top as in FIG. 1C, the support sheet and other support structures of the support structure 35 are desirably not visible.

Figure 2A:
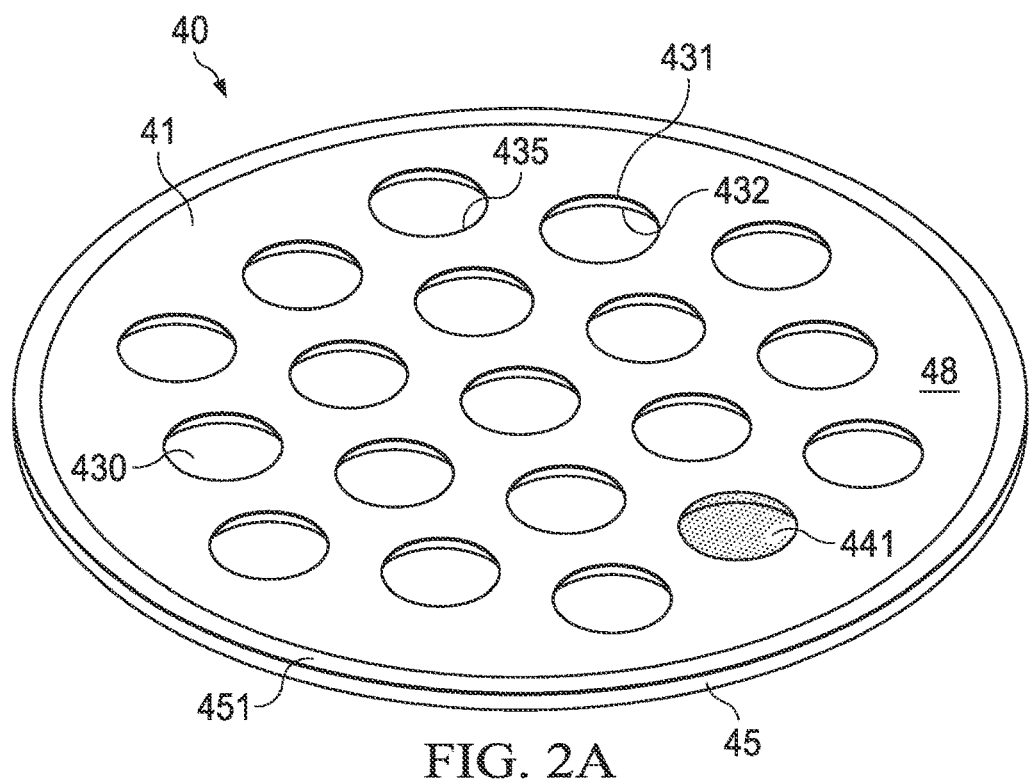
FIGS. 2A, 2B, 2C, 2D, 2E, and 2F depict perspective views of various embodiments of a treatment unit of the present invention.
Figure 2B:
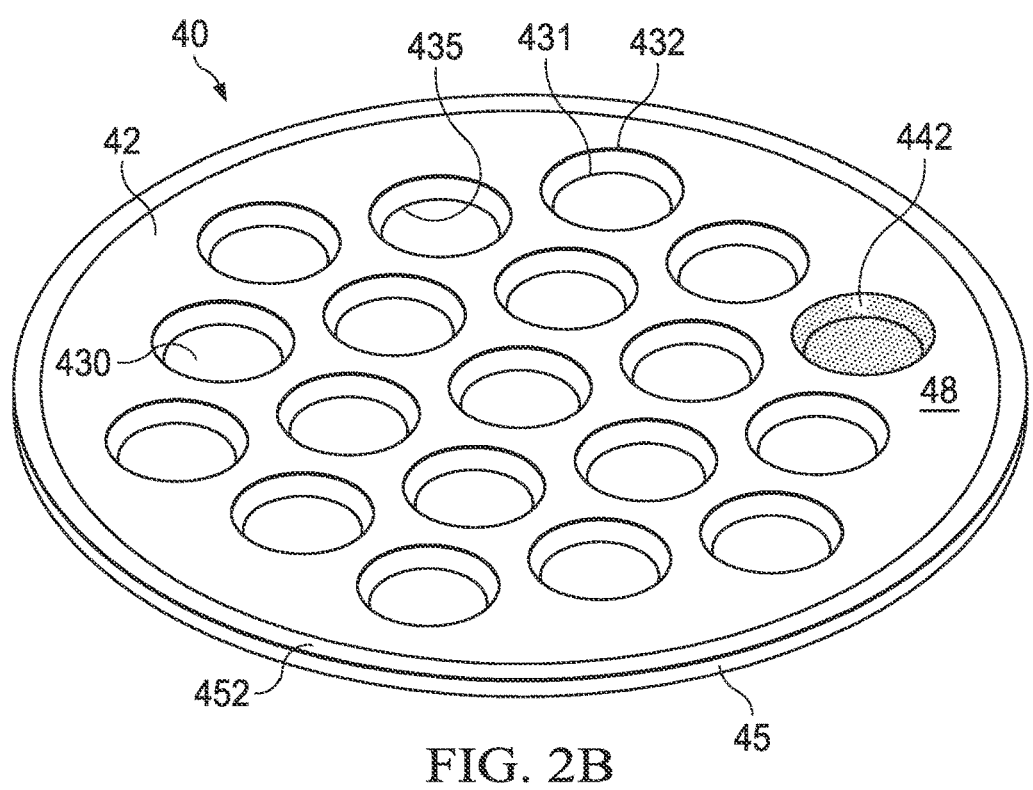
Figure 2C:
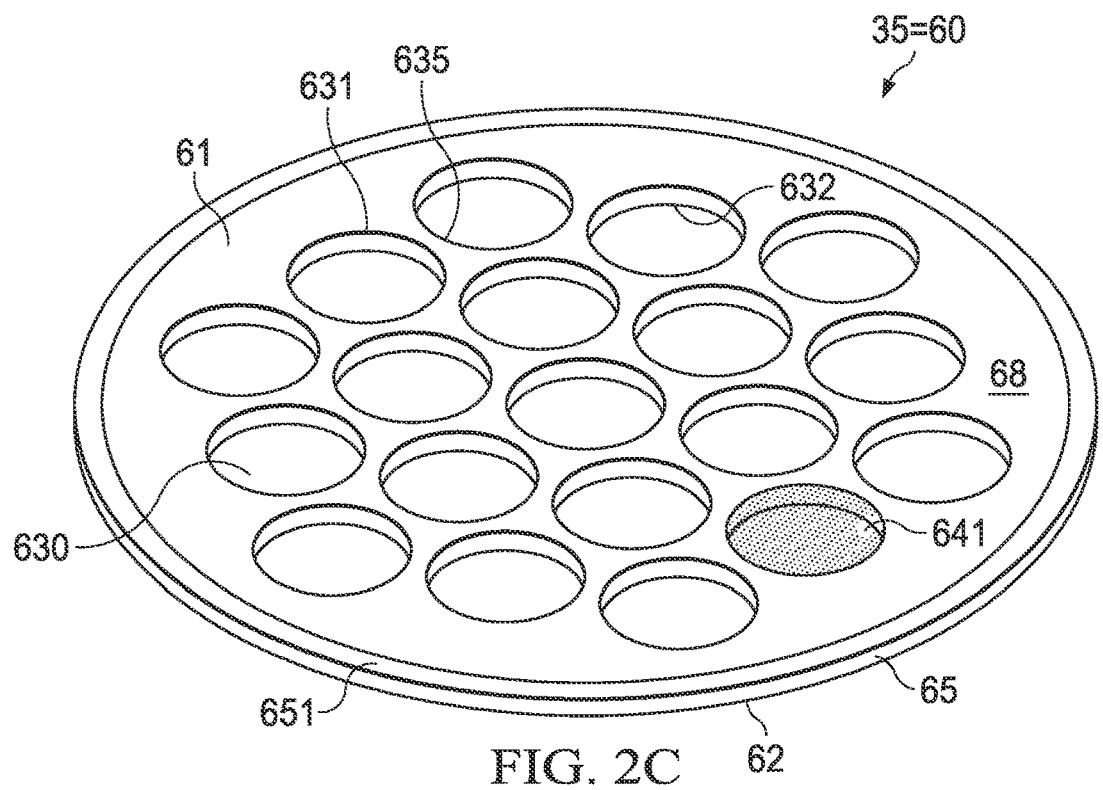
Figure 2D:
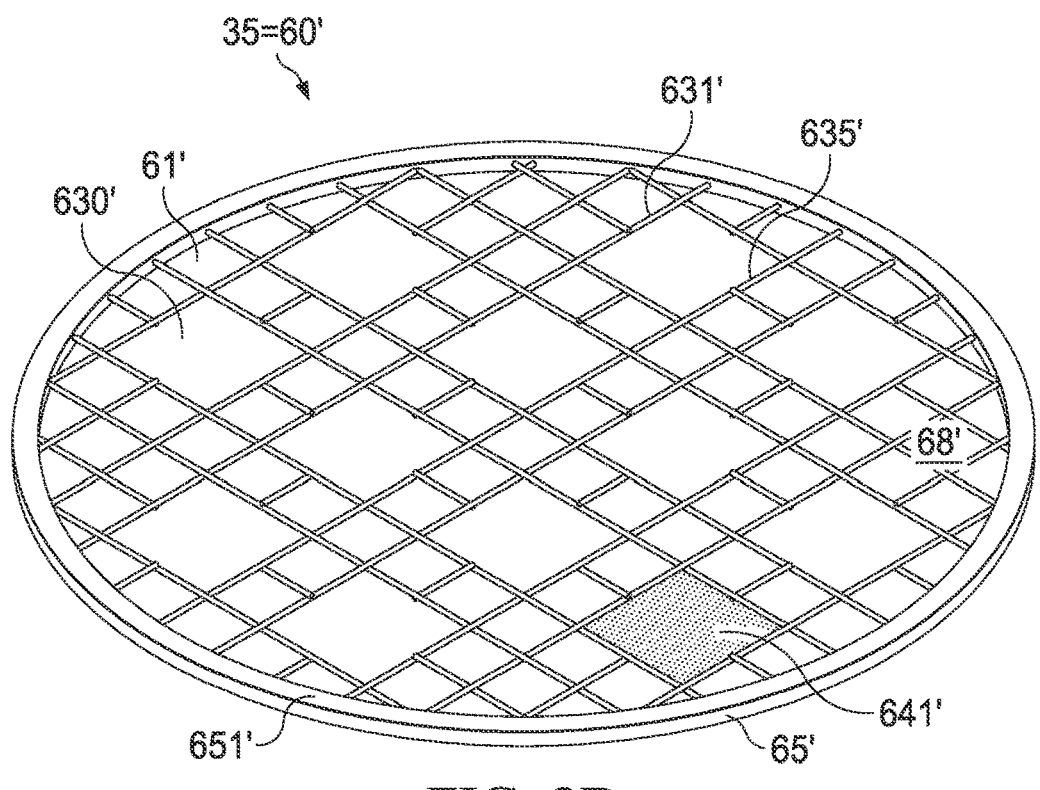

The size and shape of these apertures 630 are shown and described in further detail in FIGS. 2C and 2D and further in FIGS. 5A and 5B.

The support material 70 is generally sprayed, brushed, rolled, dipped, or printed on the lower surface of treatment sheet 40.

If the personal care product is accidentally dropped, support sheet 60 and/or support material 70 are protecting the treatment sheet such that any fragments that may break loose from the brittle material of the treatment sheet are held together.

Figure 9A:
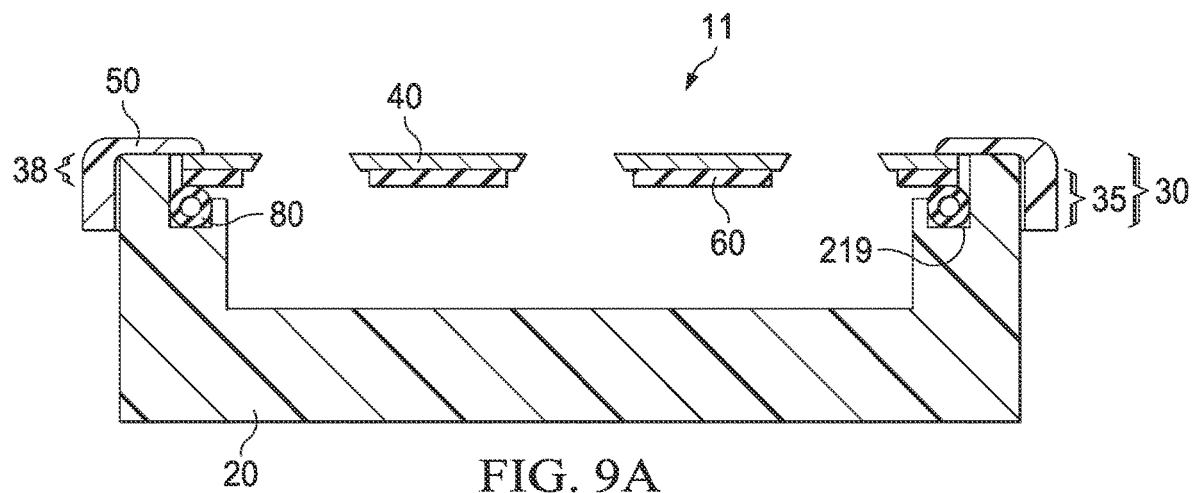
FIGS. 9A and 9B depicts two schematic cross-sectional side views of a preferred embodiment of a housing with treatment unit of a personal care product in accordance with the present invention.

The support ring 80 is shown disposed under the perimeter area of the support sheet 60. The ring is desirably in the form of a flattened ring, a solid tube, a hollow tube, or any portions or combinations made from a thermoplastic, thermoset, or elastomeric polymer. Alternatively, as will be shown below in FIGS. 7A to 7E, the support ring may be disposed under, above or around the treatment sheet 40 or the support material 70 joined to the treatment sheet 40 (FIG. 9B) or the support sheet 60 joined to the treatment sheet 40 (FIG. 9A).

If the personal care product is dropped, this support ring 80 protects the treatment sheet 40 by reducing any forces that may act upon the treatment sheet thus reducing damage to the treatment sheet (e.g., reduced fractures, reduced fragments breaking off from the treatment sheet) and preventing injury to the consumer.

In FIGS. 2A and 2B, an upper surface 41 and a lower surface 42 of a treatment sheet 40 are shown respectively. Substrate 48 of treatment sheet 40 comprises at least one material, preferably silicon or ceramic, and as noted above, comprises apertures 430 with cutting edges 435 along upper inner perimeters 431 of the apertures 430 on the upper surface 41. The cutting edges 435 of the apertures 430 are coplanar (e.g., do not protrude from) with the upper surface 41. A lower inner perimeter 432 and a lower aperture area 442 on the lower surface 42 may be desirably the same or greater than the upper inner perimeter 431 and the upper aperture area 441 on the upper surface 41, (e.g., as also shown in FIGS. 5A and 5B), allowing for debris (cut hairs, skin cells and treatment aids) to fall through easily once removed from the skin of a user.

In FIG. 2C, an upper surface 61 of a support sheet 60 is shown. Substrate 68 of support sheet 60 comprises at least one material, preferably a hard plastic or metal and as noted above, comprises apertures 630 with non-cutting edges 635 along the upper inner perimeters 631 of the apertures 630. The non-cutting edges 635 of the apertures 630 are coplanar (e.g., do not protrude from) with the upper surface 61. A lower surface 62 comprises substantially the same features as the upper surface 61. The upper inner perimeter 631 of the apertures 630 and an upper aperture area 641 formed at the upper surface 61 are desirably about the same or slightly smaller than a lower inner perimeter 632 and a lower aperture area 642 formed at the lower surface 62 (not shown), and both first and second apertures areas 641 and 642 are desirably equal to or greater than the lower aperture area 442 of the treatment sheet 40, (e.g., as exemplified in FIGS. 5A and 5B), thereby also allowing for debris (cut hairs, skin cells, treatment aids) to fall through easily once removed from the skin of a user.

In FIG. 2D, an upper surface 61' of an alternate embodiment of a support sheet 60' in a treatment unit of the present invention is shown. Here, substrate 68' of support sheet 60' comprises a mesh or wire type of material. A mesh type of material is itself comprised of a plurality of small apertures. However, the mesh material can include larger apertures 630' with non-cutting edges 635' along the perimeters of the apertures 630' as shown in FIG. 2D. The non-cutting edges 635' of the apertures 630' are coplanar (e.g., do not protrude from) with the upper surface 61'. The upper inner perimeter 631' of the apertures 630' and upper aperture area 641' formed at the upper surface 61' are desirably about the same or slightly less than the lower inner perimeter 632' and lower aperture area 642' formed at the lower surface 62' (not shown), and both first and inner perimeters 631' and 632' are desirably equal to or greater than the lower inner perimeter 432 of the treatment sheet 40, (e.g., as exemplified in FIGS. 5A and 5B), thereby also allowing for debris (cut hairs, skin cells and treatment aids) to fall through easily once removed from the skin of a user.

Figure 2E:
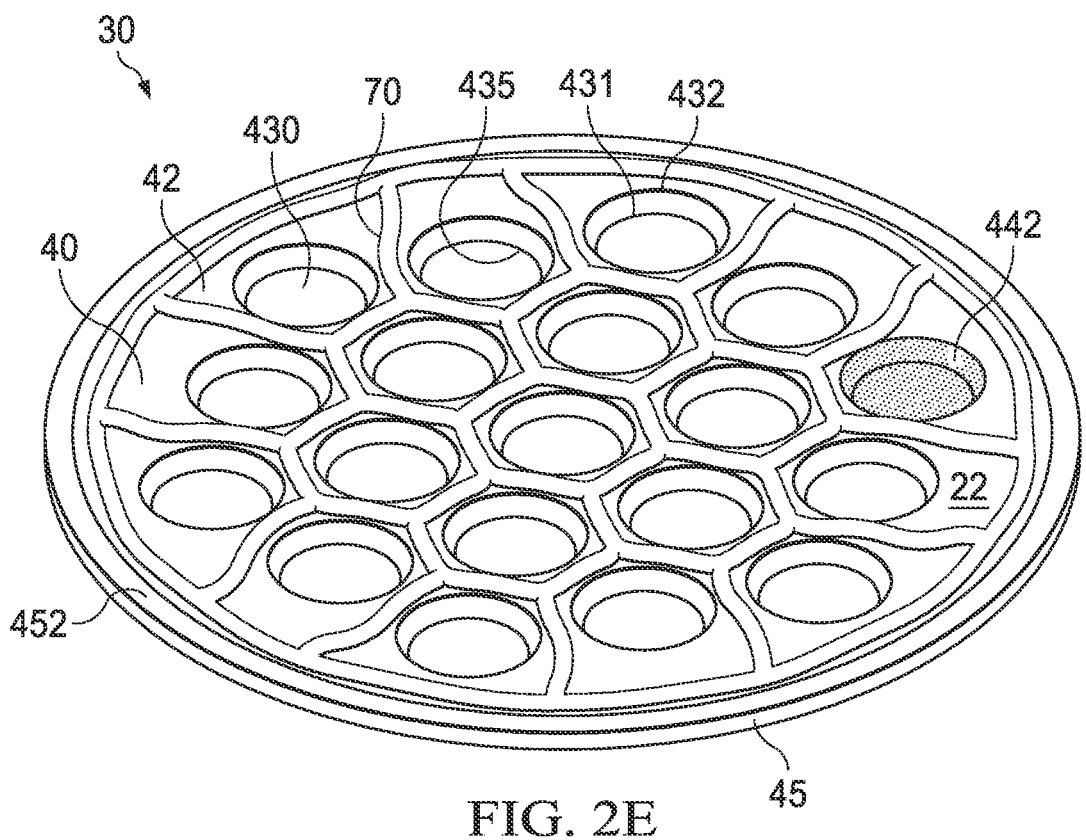

In FIG. 2E, an alternate embodiment of a treatment unit 30 of the present invention depicts a support material 70 joined to the lower surface 42 of treatment sheet 40. Here, support material 70 comprises an adhesive, a varnish or ink layer directly applied and bonded to the lower surface of the treatment sheet 40, desirably not covering the apertures 430 of treatment sheet 40. The support material 70 can be any type of fluid material which cures or hardens with heat, light and/or time, like an adhesive, varnish or ink that may be initially a fluid, but will dry or cure to form a solid material.

Figure 2F:
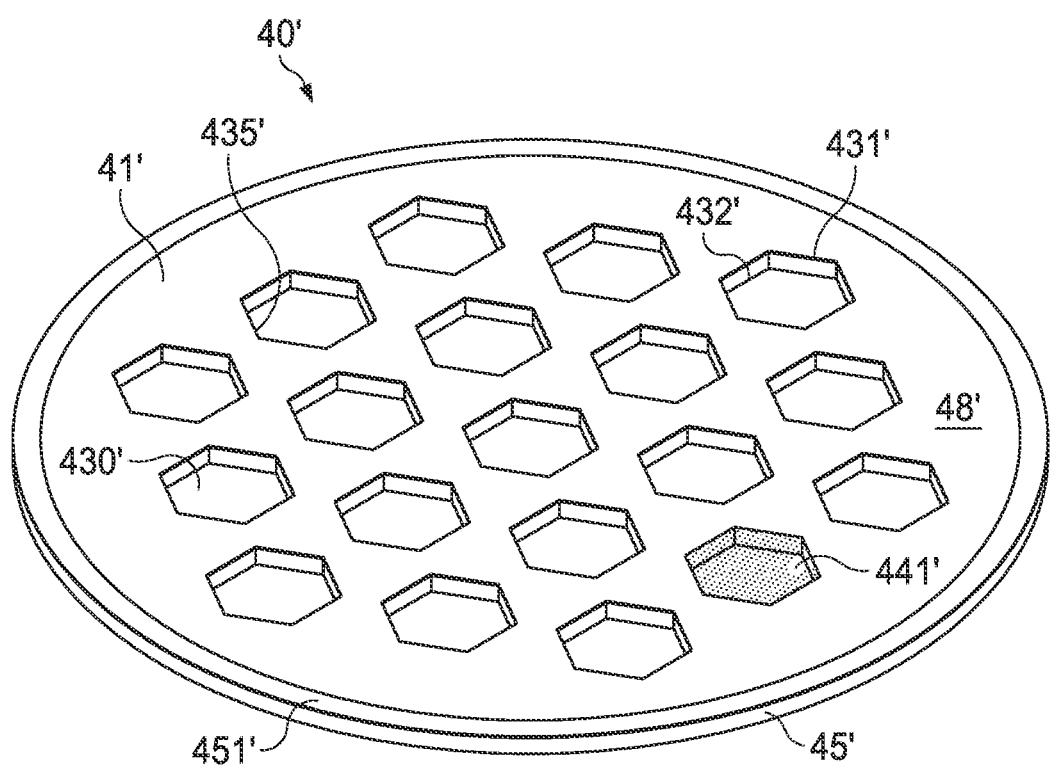

In FIG. 2F, a perspective view of an alternative embodiment of a treatment sheet 40' is shown having apertures 430' of a hexagonal shape. Any other feasible aperture shape may be contemplated as part of the present invention.

Figure 3A:
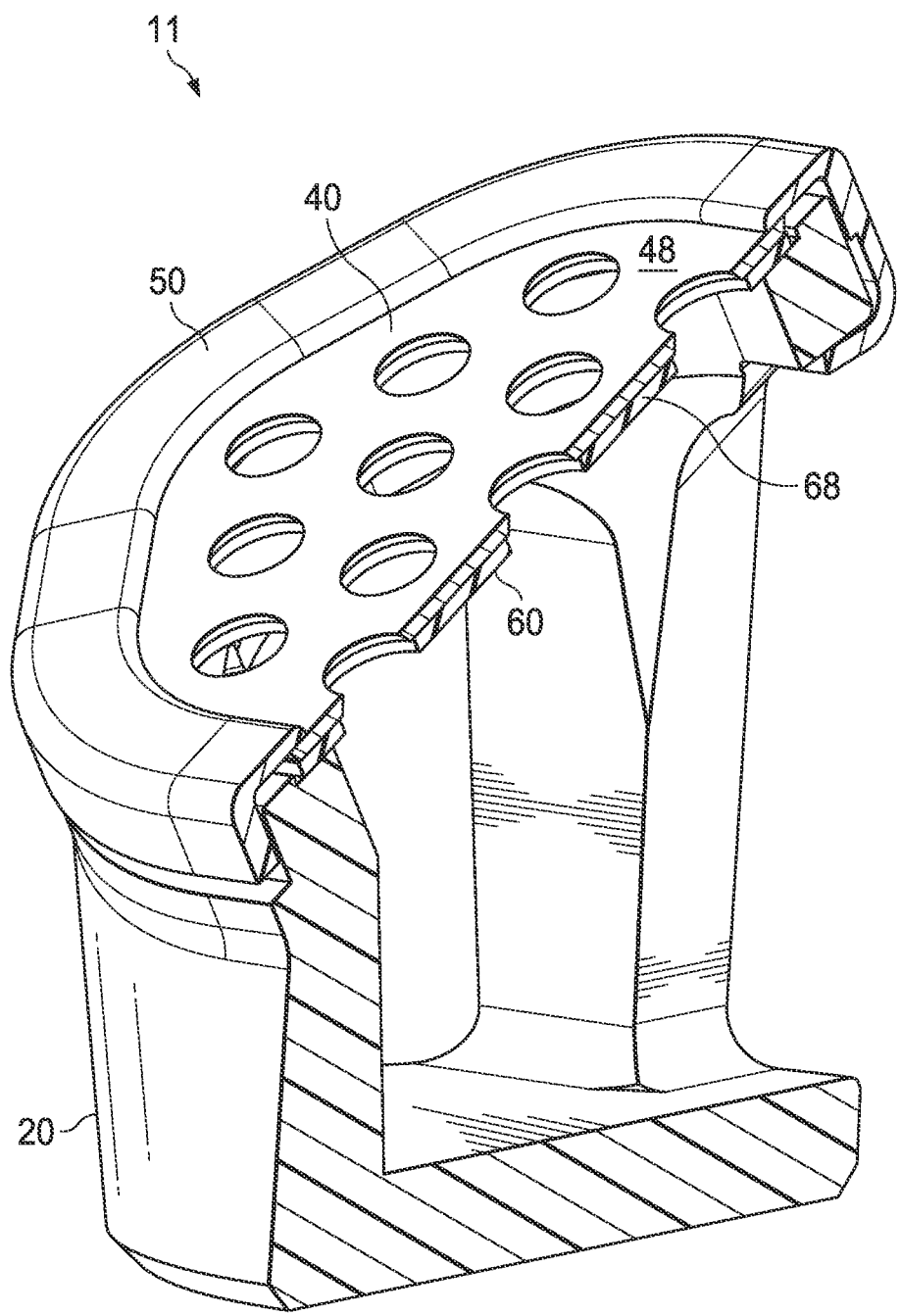
FIGS. 3A and 3B depict a cross-sectional perspective view taken along A-A of FIG. 1A, and an exploded side view, respectively, of an embodiment of an upper product end of a personal care product having a treatment unit in accordance with the present invention.
Figure 3B:
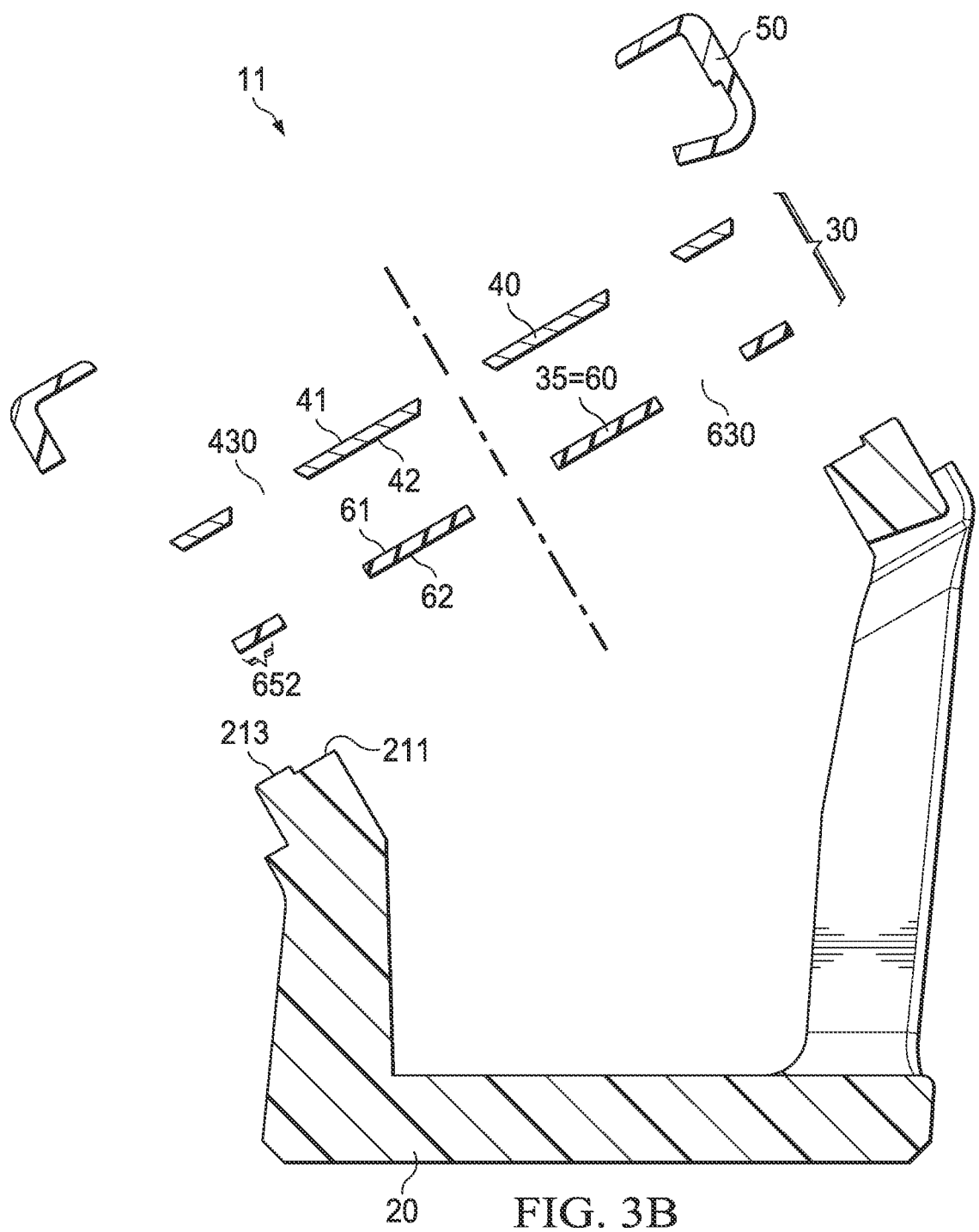

Turning now to FIGS. 3A and 3B, a cross-sectional side and exploded view of an upper product end 11 taken along plane A-A of FIG. 1A is shown. Treatment unit 30 comprises a treatment sheet 40 of a first material, which is a solid brittle material, such as silicon or ceramic and a support structure 35. In this embodiment, the support structure 35 only comprises of a support sheet 60 with apertures 630 comprised of a second material 68 which is a solid material, such as a hard plastic, ceramic or metal. The first material 48 of the treatment sheet 40 and the second material 68 of the support sheet 60 may be different materials. The upper surface 61 of support sheet 60 is joined to the lower surface 42 of the treatment sheet 40 as shown in FIG. 3B. The lower surface 62 of support sheet 60 can be disposed on upper surfaces 211 or 213 of the housing 20. These upper surfaces of the housing effectively serve as location guides for the treatment unit 30 overall. A frame member 50, disposed over the upper surface 41 of the treatment sheet 40, is also shown, and can be utilized to hold the treatment unit in place on the housing.

Figure 4A:
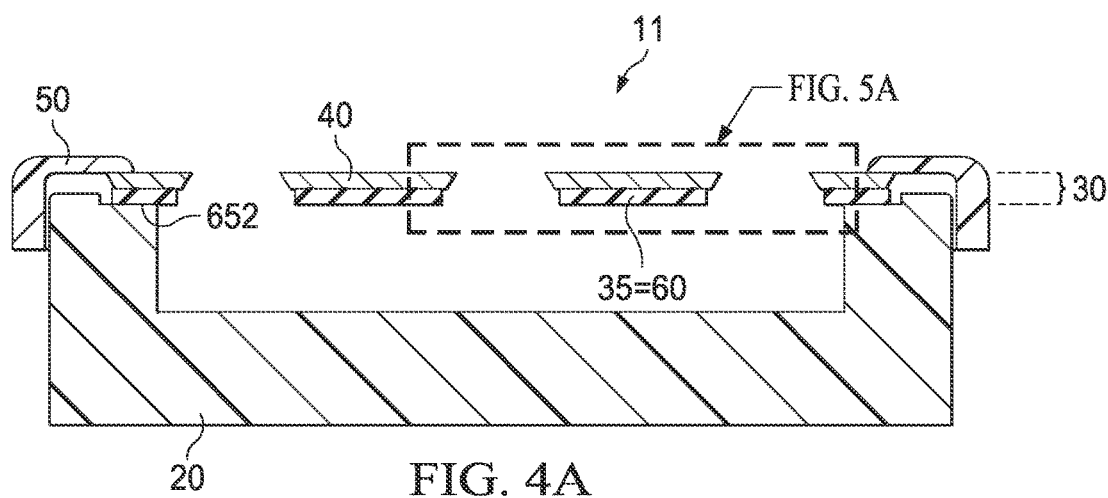
FIGS. 4A, 4B, 4C depict schematic cross-sectional side views of various embodiments of a housing with treatment unit of a personal care product of the present invention.
Figure 4B:
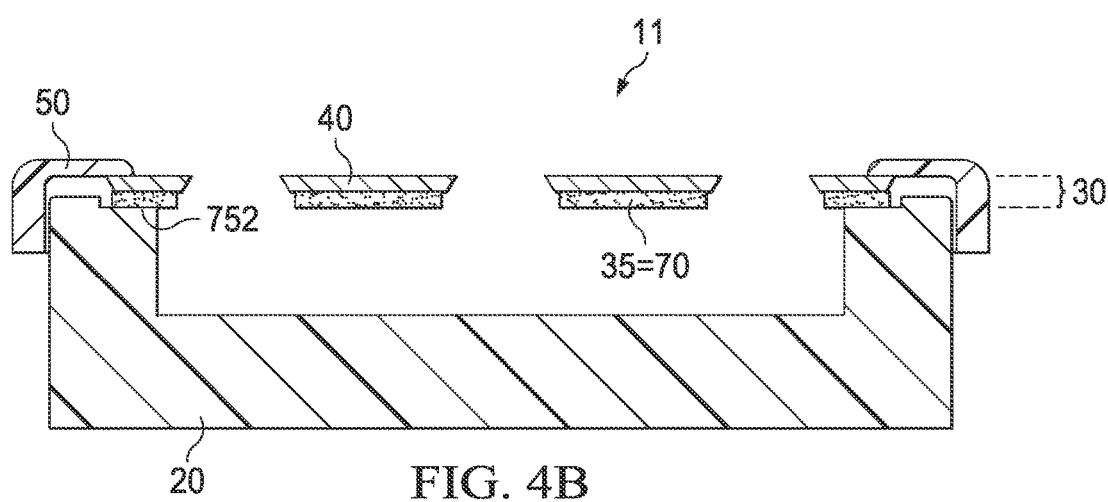
Figure 4C:
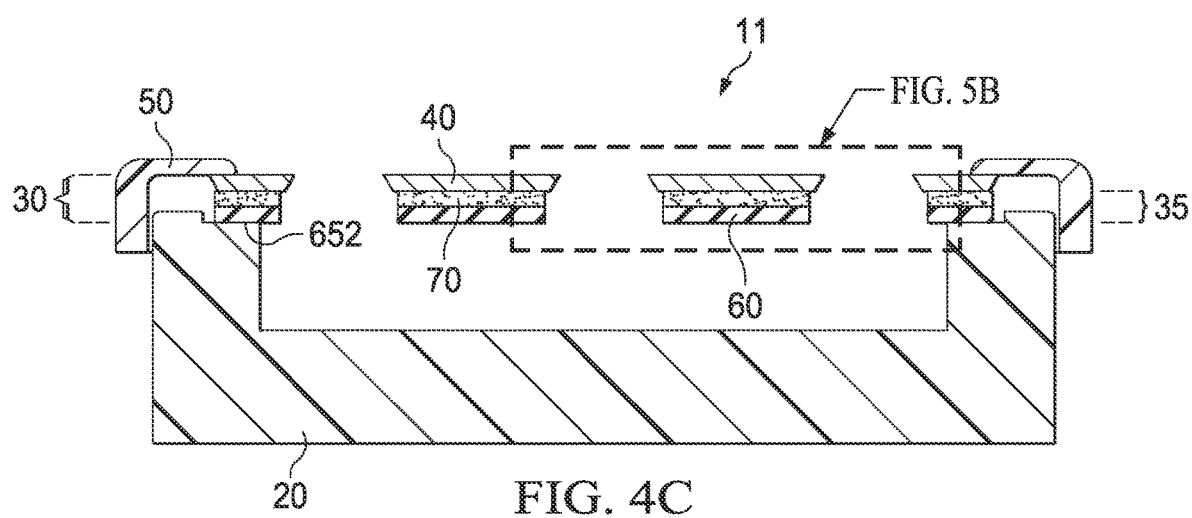

FIGS. 4A to 4C show schematic cross-sectional views of two further embodiments of the treatment unit 30 according to the present invention. The schematic of the upper product end 11 of FIG. 4A depicts a treatment unit 30 comprising a treatment sheet 40 and a support structure 35, whereby the support structure 35 comprises only support sheet 60 in accordance with FIGS. 3A and 3B. In this embodiment, the treatment unit 30 is held together by being sandwiched between the housing 20 and the frame member 50. The support sheet 60 can be a solid material, such as a hard plastic or metal.

In one embodiment of the present invention, the support sheet 60 is comprised of stainless steel having a thickness of between 0.1 to 1 mm, desirably about 0.30 to 0.5 mm.

The schematic of the upper product end 11 of FIG. 4B depicts a treatment unit 30 comprising a treatment sheet 40 and a support structure 35, whereby the support structure 35 comprises only support material 70 in accordance with FIG. 2E. The support material 70 may comprise of adhesive, varnish or ink which will be initially applied as a fluid and subsequently dry or cure to form a solid material. In this way, support material 70 is protecting the treatment sheet such that any fragments that may break loose from the brittle material of the treatment sheet when the personal care product is accidentally dropped are held together.

The schematic of the upper product end 11 of FIG. 4C depicts a treatment unit 30 comprising a treatment sheet 40 and a support structure 35, whereby the support structure 35 comprises both a support sheet 60 of a solid material such as hard plastic or metal and a support material 70, such as an adhesive, disposed between the treatment sheet 40 and support sheet 60. The adhesive material may be sprayed or brushed on the lower surface 42 of the treatment sheet 40 in accordance with FIG. 2E and/or the upper surface 61 of the support sheet 60, prior to aligning apertures 430 and 630 of the treatment and support sheets, respectively, and leaving the open areas of the aligned apertures 430 and 630 of the treatment and support sheets uncovered, such that debris (cut hairs, skin cells and treatment aids) and water can be flushed through. The treatment sheet 40 and the support sheet 60 and/or the support material 70 can be pressed or compressed together in the process of forming the treatment unit 30 for robustness.

In FIGS. 5A and 5B, close-up cross-sectional schematic views are shown of portions 5A and 5B of a treatment unit 30 taken from FIGS. 4A and 4C, respectively.

FIG. 5A represents the treatment unit 30 described and shown in FIGS. 3A, 3B, 4A, and 4B, comprising a treatment sheet 40 and a support structure 35 formed of either a support sheet 60 of a solid material such as a hard plastic or metal, or a support material 70 such as an adhesive, varnish or ink.

FIG. 5B represents the treatment unit 30 described and shown in FIG. 4C, comprising a treatment sheet 40 and a support structure 35 formed of a sheet 60 or other solid material and a support material 70 such as an adhesive to assist in keeping sheet 60 joined to sheet 40. A support material 70 may be necessary in some cases if the material 48 of the treatment sheet 40 is different than the material 68 of the support sheet 60.

The present invention contemplates the alignment of the apertures 430 of the treatment sheet 40 with apertures 630 of the support sheet 60 as is clearly depicted in FIGS. 5A and 5B. This alignment provides for a flow path into the cavity of the housing for debris removal. Generally, the apertures of the support sheet 60 are bigger than the apertures of the treatment sheet 40. When viewing the treatment sheet directly from the top as in FIG. 1C, the support sheet and other support structures of the support structure 35 are desirably not visible. FIGS. 5A and 5B also clearly depict upper inner perimeter 431 as larger than lower inner perimeter 432 of the treatment sheet 40 and larger than upper and lower perimeters 631 and 632, respectively of the support sheet 60.

Figure 6A:
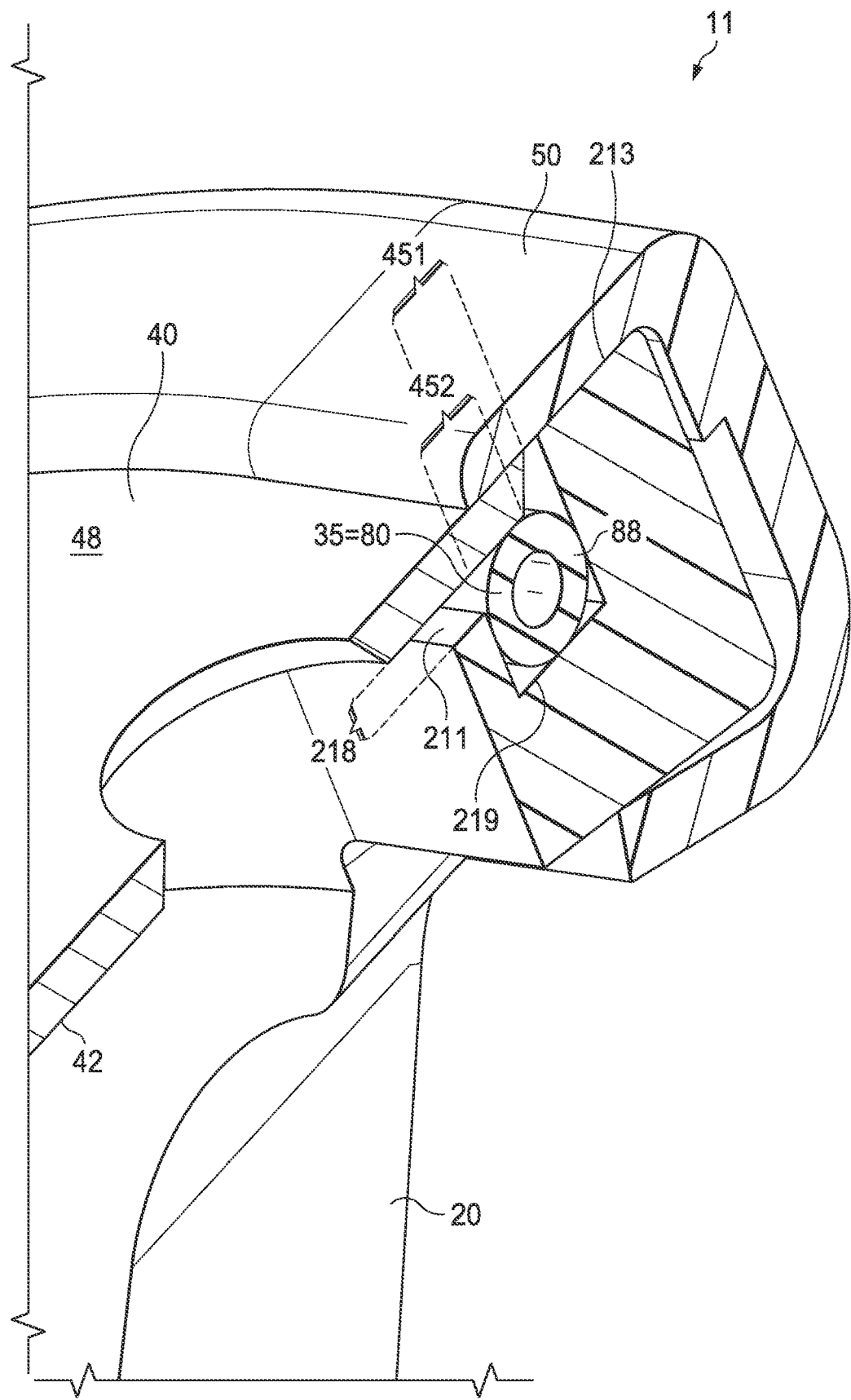
FIGS. 6A and 6B depict a close up cross-sectional perspective view (taken along A-A of FIG. 1A), and an exploded side view, respectively, of an upper product end of a personal care product having an alternate embodiment of a treatment unit in accordance with the present invention.
Figure 6B:
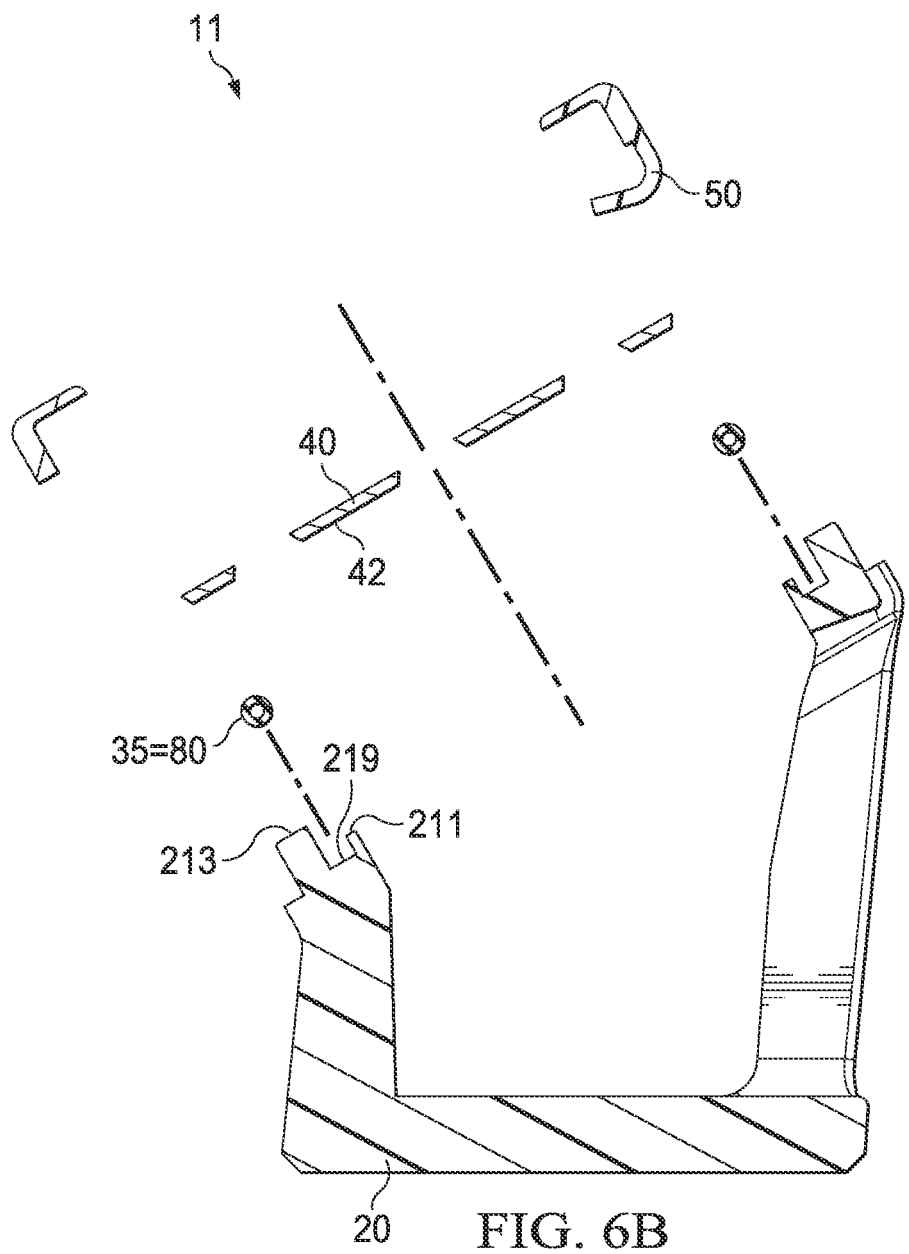
Figure 7A:
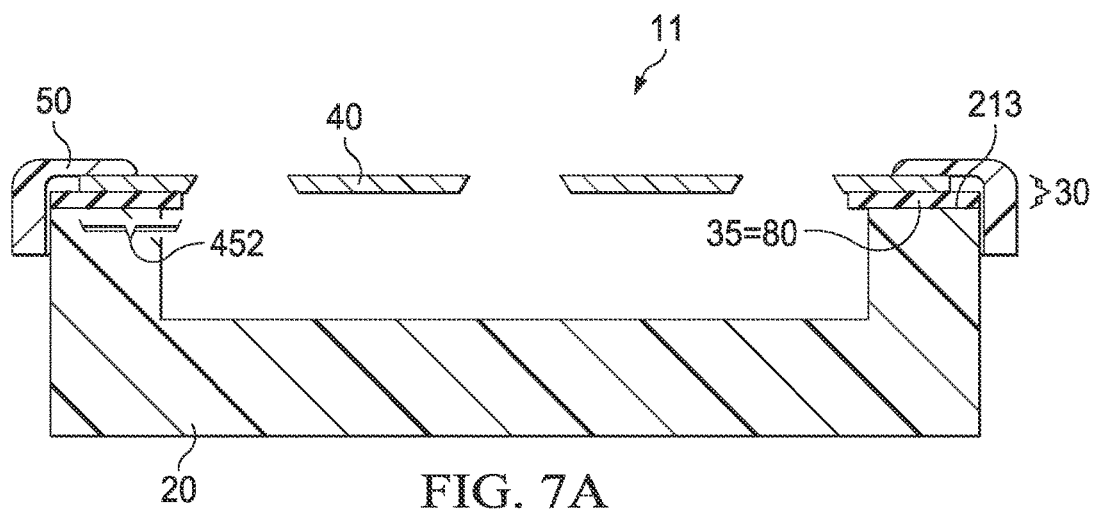
FIGS. 7A, 7B, 7C, 7D, and 7E depict five schematic cross-sectional side views of various alternate embodiments of a housing with treatment unit of a personal care product in accordance with the present invention.
Figure 7B:
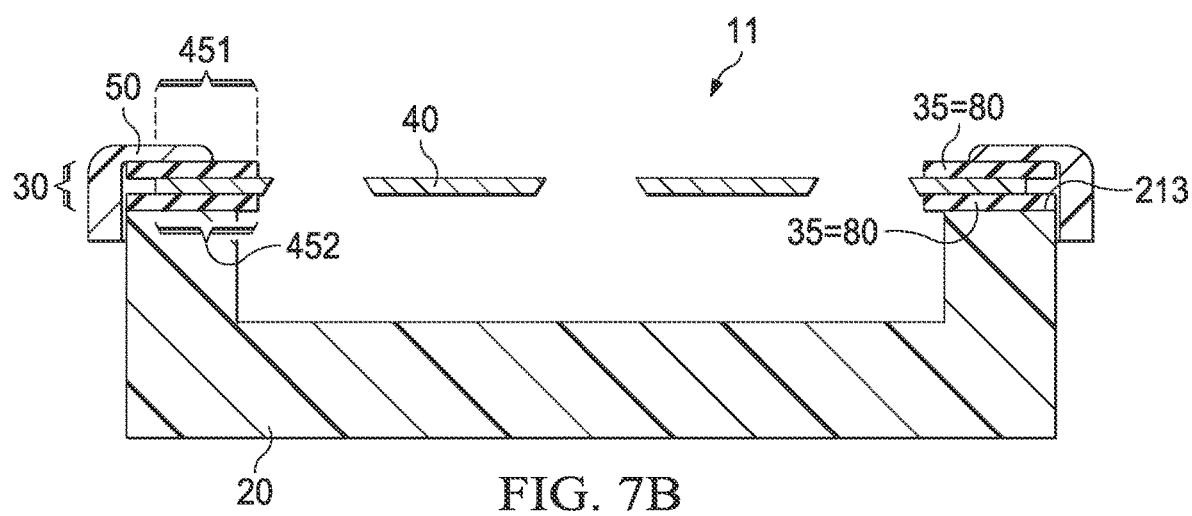

Referring now to FIGS. 6A and 6B, a close-up cross-sectional perspective view (taken along A-A of FIG. 1A), and an exploded side view, respectively, of an upper product end 11 are shown. Treatment unit 30 is shown comprising a treatment sheet 40 of a first material 48 and a support structure 35. The support structure 35 as shown comprises only of a support ring 80 made from a third material 88 desirably an elastomer. The first material 48 of the treatment sheet 40 and the third material 88 of the support ring 80 can be different materials. The support ring 80 is joined to the lower outer perimeter area 452 on the lower surface 42 of the treatment sheet 40 as shown in FIG. 6A. The support ring 80 is disposed on an upper surface 213 (as shown in FIGS. 7A and 7B) or a groove 219 formed between upper surfaces 213 and step surface 211 of the housing 20, effectively serving as a location guide for the treatment unit 30. A gap 218 is formed between the lower surface 42 of the treatment sheet 40 at the lower perimeter area 452 and the step surface 211 of the housing 20. The gap 218 is desirable to allow the support ring 80 to compress or deform when forces are applied during use or from impact when the product is accidentally dropped without the treatment sheet being pushed onto the upper surface 213 or step surface 211 which could result in fracture of the treatment sheet, i.e., the support ring 80 acts as a force absorber. A frame member 50, disposed over the upper outer perimeter area 451 on the upper surface 41 of the treatment sheet 40, is also shown, and can be utilized to hold the treatment unit in place on the housing.

Schematic cross-sectional views of alternate embodiments of the treatment unit 30 on a housing 20 in FIGS. 7A to 7E showing variations of the support ring 80 as generally shown in FIGS. 6A and 6B. In each of FIG. 7A to 7E, the support ring 80 is comprised of a flexible material, such as rubber, elastomer, or other type of polymer. The material of the ring provides an elasticity that allows the support ring to return to its original state after an external force has acted upon the treatment unit which is desirable in supporting the treatment sheet in that it absorbs the force and prevents the treatment sheet from fracturing The schematic of the upper product end 11 of FIG. 7A depicts a treatment unit 30 comprising a support structure 35 in the form of a support ring 80. The support ring 80 in FIG. 7A is comprised of flattened portions or "spacers" disposed beneath the treatment sheet and joined or coupled to the sheet on the outer lower perimeter areas 452 of the treatment sheet. The flattened ring is disposed generally horizontally (e.g., parallel to the treatment sheet 40 and the upper housing surface 213). In this way, even if the treatment sheet 40 bends or flexes downward upon a drop or impact, it will be protected by the support ring 80.

The schematic of the upper product end 11 of FIG. 7B depicts a treatment unit 30 comprising a support structure 35 in the form of two support rings 80, one above and one below the treatment sheet. The support rings 80 in FIG. 7B are both comprised of flattened portions or "spacers" disposed above and beneath the upper and lower outer perimeter areas 451 and 452, respectively, of the treatment sheet 40 and generally horizontally (e.g., parallel to the treatment sheet 40 and the upper housing surface 213). While the material of the two rings is desirably different than the treatment sheet, the material of the two rings does not have to be identical. For instance, the upper ring can be more or less elastic than the lower ring. Having two rings in the support structure provides added support in two areas for the treatment sheet in case of accidental drop or force upon the sheet or the product.

Figure 7C:
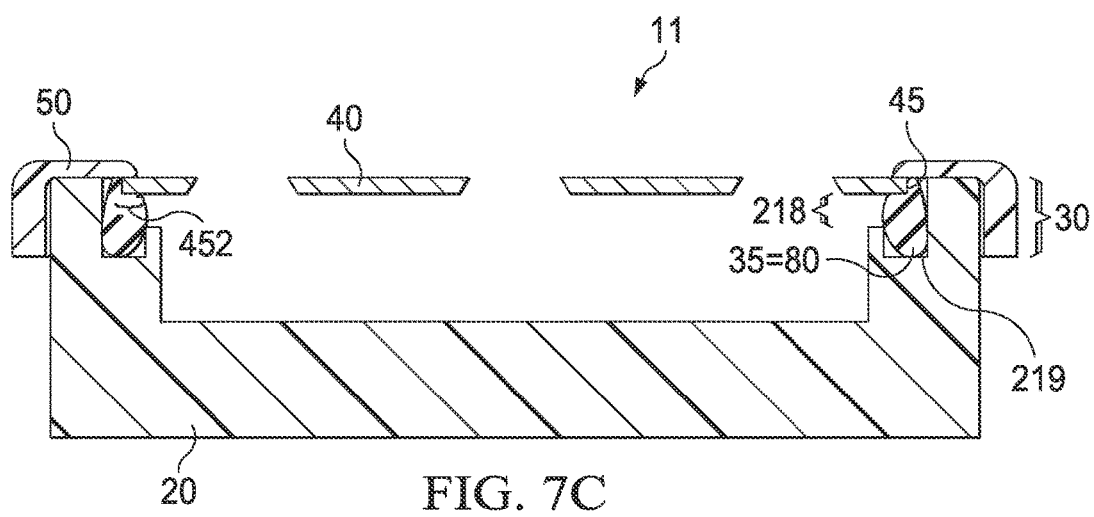

The schematic of the upper product end 11 of FIG. 7C depicts a treatment unit 30 comprising a support structure 35 in the form of a support ring 80 comprised of elastomeric polymer disposed along the outer perimeter 45 of the treatment sheet 40 and optionally also on the lower outer perimeter area 452 of the treatment sheet 40. Such a ring may be provided by applying an elastomeric polymer that is initially fluid and solidifies after the treatment sheet has been joined to the ring. Having a ring in the support structure providing support in two areas adjacent the treatment sheet provides added support for the treatment sheet in case of accidental drop or force upon the sheet or the product.

Figure 7D:
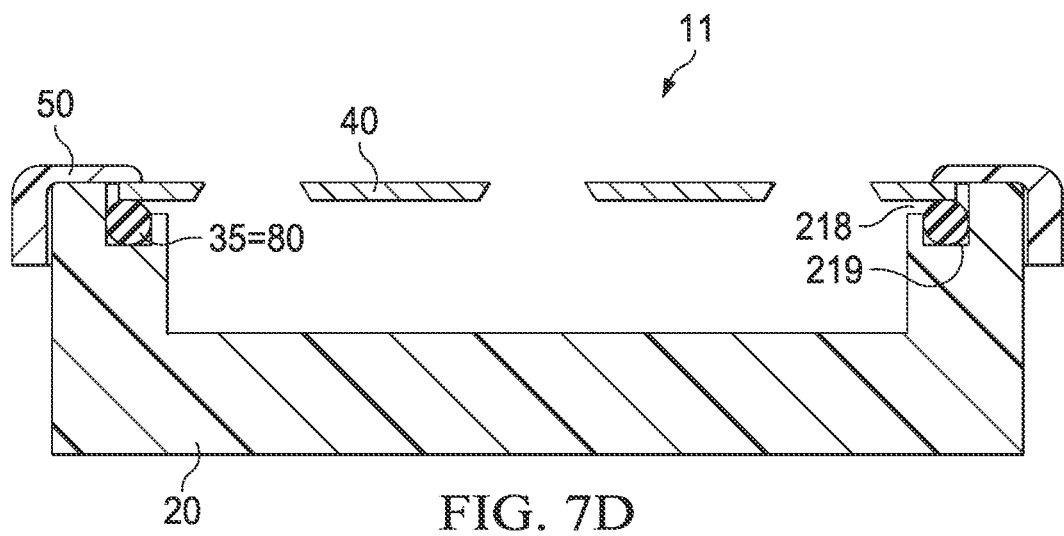
Figure 7E:
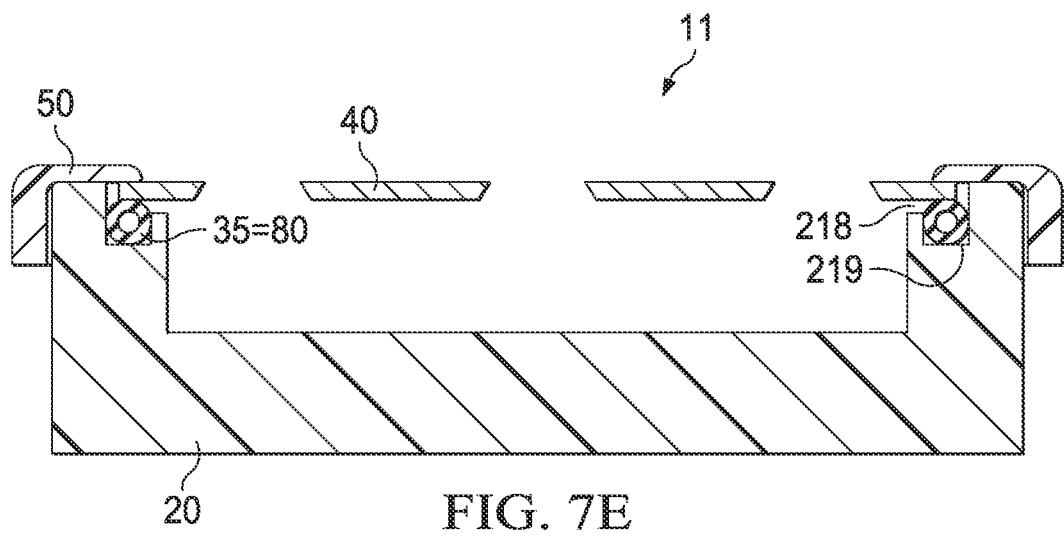

The schematic of the upper product end 11 of FIGS. 7D and 7E depict treatment units 30 comprising a treatment sheet 40 joined to a support structure 35, where the support structure 35 comprises a ring that is in the form of a tube. In FIG. 7D, the tube is solid and in FIG. 7E the tube is hollow. The tube construction of the support rings in FIGS. 7D and 7E provide added flexibility and elasticity along a curved outer structure of the tube. The tube can be pressed down but can return to its original state. A hollow tube of FIG. 7E can theoretically provide more "give" in that upon impact it can be pressed down further than a solid tube.

In FIGS. 7C, 7D, and 7E, a gap 218 is shown, formed between the lower surface 42 of the treatment sheet 40 at the lower perimeter area 452 and the step surface 211 of the housing 20. The gap 218 is desirable as it allows the support ring 80 to compress or deform when forces are applied to it during use or from impact, when the product is accidentally dropped. In this way, the treatment sheet is not pushed onto the upper surface 213 or step surface 211 which could result in fracture of the treatment sheet, i.e., the support ring 80 acts as a force absorber.

The treatment sheet 40 and the support structures (e.g., rings) of FIGS. 7A-7E can be pressed or compressed together in the process of forming the treatment unit 30 and/or with the frame member 50, providing a robust, stable product.

Figure 8A:
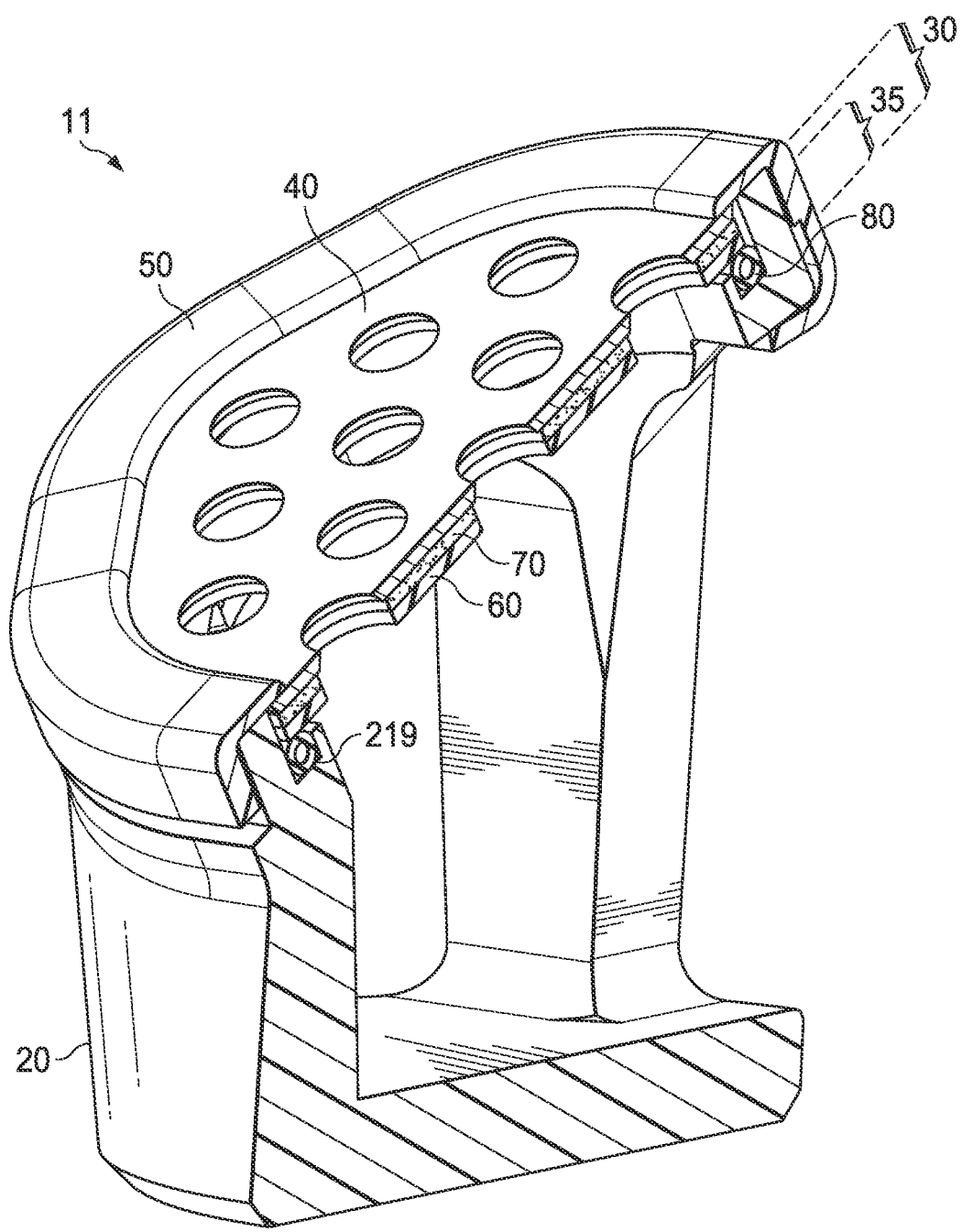
FIGS. 8A and 8B depict a cross-sectional perspective (taken along A-A of FIG. 1A), and an exploded side view, respectively, of an upper product end of a personal care product having an alternate embodiment of a treatment unit with a support structure in accordance with the present invention.
Figure 8B:
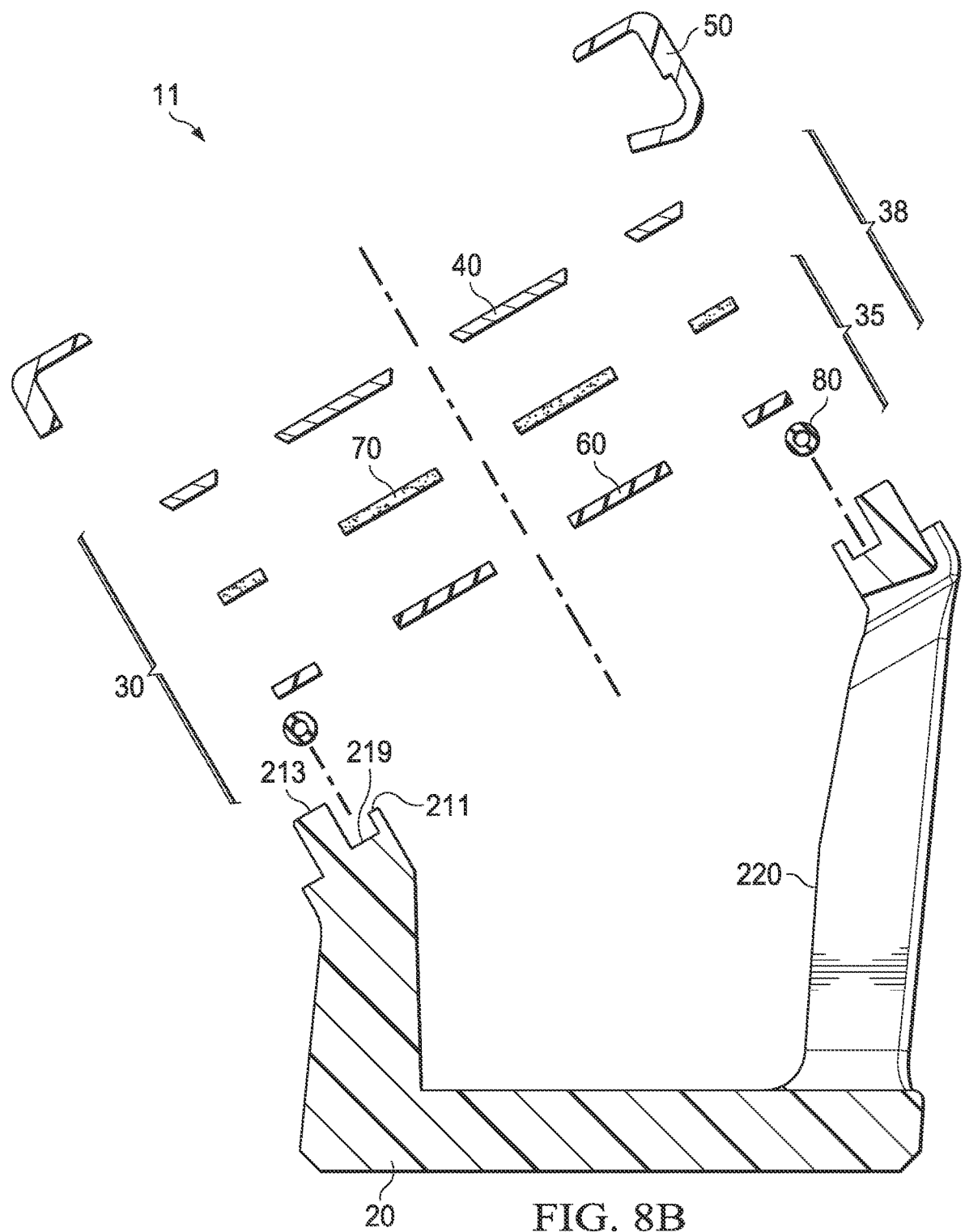

Turning now to FIGS. 8A and 8B, a cross-sectional perspective view and an exploded side view of an upper product end 11 taken along plane A-A of FIG. 1A are shown, respectively. Treatment unit 30 is shown comprising a treatment sheet 40 of a first material (e.g., silicon and/or diamond) and a support structure 35. An upper treatment unit portion 38 is shown coupled together and comprising the treatment sheet 40, a support material 70 and a support sheet 60. The support structure 35 comprises three types of support members: a support material 70, a support sheet 60 and a support ring 80. The material of the treatment sheet and the materials comprising the support material 70, the support sheet 60 and the support ring 80 are all desirably different. For instance, the support material 70 can be an adhesive, varnish or ink, the support sheet 60 can be a hard plastic or metal, and the support ring 80 can be comprised of an elastomeric polymer. Though the present invention contemplates having one or more of each of the support material 70, the support sheet 60 and the support ring 80, of any material and in any arrangement, the embodiments shown in FIGS. 8A, 8B and 1B generally provide maximum support for the treatment sheet 40 in the personal care product of the present invention since the support structure 35 shown is comprised of a "three-layer" or a "three-way" support structure 35 rendering the device capable of defending damage due to forces arising from use, drop or impact from any direction.

Figure 9B:
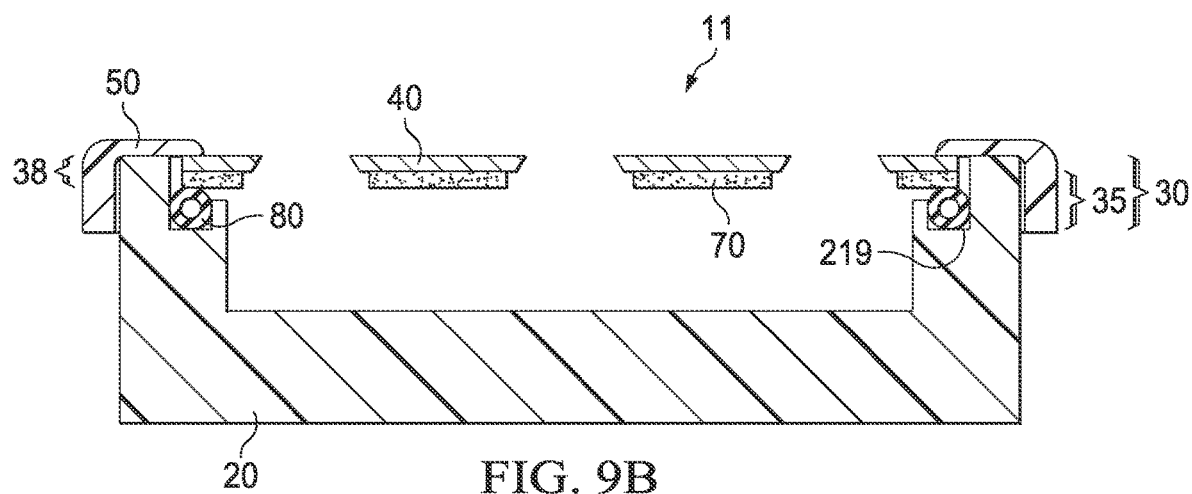

FIGS. 9A and 9B depicts two schematic cross-sectional side views of the present invention personal care product embodiments of a housing with treatment unit shown in FIGS. 4A and 4B, each having an additional support ring 80. In FIG. 9A, a support ring 80 is disposed beneath a support sheet 60. In FIG. 9B, a support ring 80 is disposed beneath a support material 70. The support ring 80 performs the same function as described above.

Figure 10:
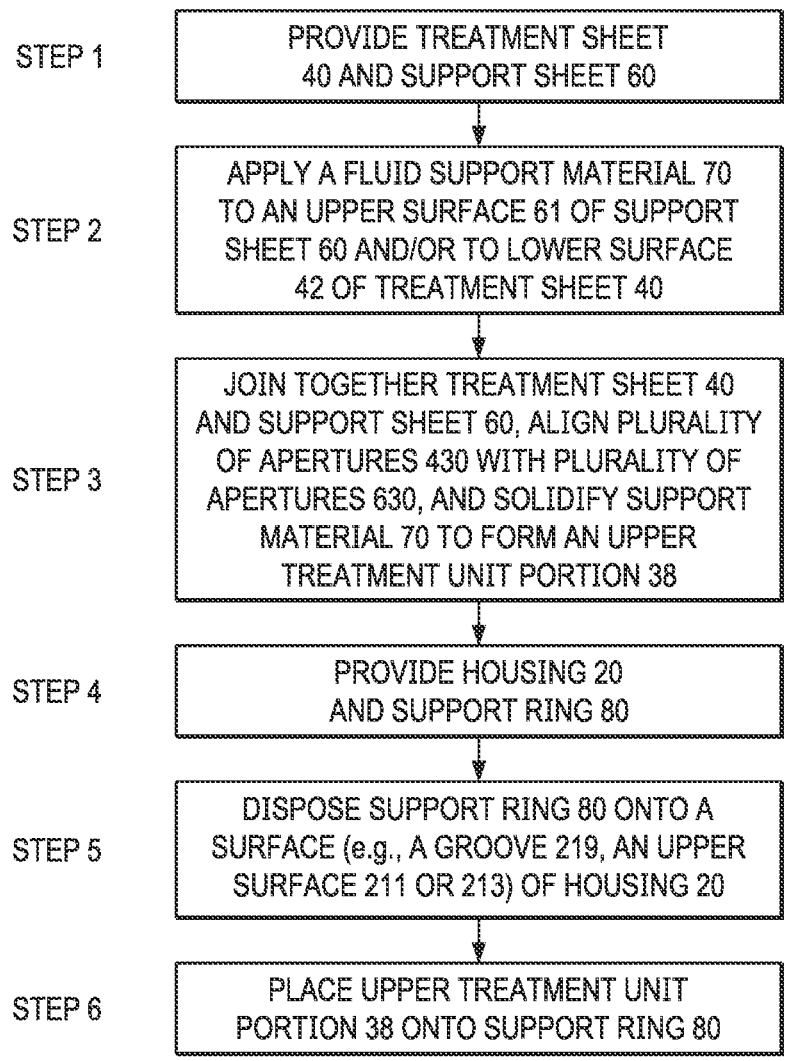
FIG. 10 illustrates a method for assembly of a treatment unit in accordance with the present invention.

A non-limiting method of making the treatment unit of the present invention including the support structure is shown in the flow diagram of FIG. 10. At step 1, a treatment sheet 40 capable of treating both the skin and removing hair is provided. Also provided at step 1 is a support sheet 60 of the type described herein. The treatment sheet provided comprises apertures with cutting edges and the support sheet provided comprises apertures without cutting edges. At step 2, a support material or fluid is applied to an upper surface 61 of support sheet 60 and/or to lower surface 42 of treatment sheet 40. The fluid is preferably an adhesive (e.g., a glue). At step 3, the treatment sheet 40 and the support sheet 60 from step 2 are joined together in such a way that the apertures of both the treatment sheet and the support sheet are aligned. The step 3 of joining further includes the step of solidifying the support material such that the treatment sheet and the support sheet are bonded together, forming an upper treatment unit portion 38. At step 4, a housing 20 and a support ring 80 are provided. At step 5, the support ring is disposed onto a surface of the housing 20. For instance, the support ring could be disposed into a groove 219 on a surface of the housing or the support ring can be disposed on an upper surface 211 or 213 of the housing. The support ring can be a physical ring as disclosed herein and inserted into the groove or the support ring can be comprised of a material that is formed into a ring as it is inserted into the groove, such as a silicone rubber. At step 6, the upper treatment unit portion 38 is placed onto the support ring (e.g., an upper surface of the support ring). In this way, the treatment unit of the personal care product is formed and is also placed on the housing. Other feasible methods of forming the support structure and coupling it to the treatment sheet and housing are contemplated by the present invention. For instance, any or all elements of the support structure 35, support sheet 60, support material 70, and/or support ring 80 may be coupled together prior to joining to the treatment sheet or prior to joining to the housing.

The illustrations presented herein are not intended to be actual views of any particular substrate, apparatus (e.g., device, system, etc.), or method, but are merely idealized and/or schematic representations that are employed to describe and illustrate various embodiments of the disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." The term "about" as used herein generally signifies approximately or around. As one example, when a range of numerals are given, e.g., if "about 4 to about 40" is or "4 to 40" is disclosed herein, the present invention contemplates the recited value of "4" and "40" and a functionally equivalent range surrounding each of the 4 and the 40, which can generally be plus or minus 10 percent of each number. Thus, for clarity, if a reference is described as being "4 to 40" this signifies it could be a functionally equivalent range of 4 and a functionally equivalent range of 40 or "about 4 to about 40." The latter signifies the range of "3.6 to 44" as being encompassed by the present invention since the range of 3.6 to 4.4 represents plus and minus 10 percent of 4, respectively and the range of 36 to 44 represents plus and minus 10 percent of 40, respectively.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover, in the appended claims, all such changes and modifications that are within the scope of this invention.

What is claimed is:

1. A method of making a personal care product comprising the steps of
providing a treatment sheet comprised of a first material and a first plurality of apertures, said treatment sheet having an upper and a lower surface;
joining a support structure to said lower surface of said treatment sheet, wherein said support structure comprises a support sheet and a support ring disposed at a perimeter of the treatment sheet, wherein the support ring is one of a flattened ring, a solid tube, or a hollow tube made from a thermoplastic, a thermoset, an elastomeric polymer, or any combination thereof; and
providing a housing and of disposing said support ring on or in an upper surface of the housing, wherein a gap is formed between the lower surface of the treatment sheet and the upper surface of the housing.

2. The method of claim 1, wherein said support sheet comprises a second plurality of apertures.

3. The method of claim 1, wherein said step of joining further comprises disposing said support sheet beneath said treatment sheet.

4. The method of claim 3, wherein said support sheet comprises a second plurality of apertures and wherein said step of joining further comprises aligning said first plurality of apertures and said second plurality of apertures.

5. The method of claim 1 wherein the support structure comprises a support material in the form of a fluid and wherein said step of joining further comprises solidifying said fluid of said support material such that said treatment sheet and said support sheet are joined together forming an upper treatment unit portion.

6. The method of claim 5, wherein said support ring is disposed below said support sheet or joined to said treatment sheet via said support material prior to said solidifying step.

7. The method of claim 5, further comprising providing a housing having a groove and disposing said support ring within said groove.

8. The method of claim 5, further comprising placing said upper treatment unit portion onto an upper surface of said support ring.

9. The method of claim 1, wherein said support sheet is selected from a metal, a ceramic, a thermoplastic, a thermoset, or an elastomeric polymer.

10. The method of claim 1, wherein said support ring is comprised of RTV silicone rubber.

11. The method of claim 1, wherein said treatment sheet comprises silicon or ceramic.

* * * * *